US005473423A

United States Patent [19]
Ruegenberg et al.

[11] Patent Number: 5,473,423
[45] Date of Patent: Dec. 5, 1995

[54] METHOD AND APPARATUS FOR OBTAINING MEASUREMENTS IN A PLURALITY OF LIGHT WAVEGUIDES

[75] Inventors: Gervin Ruegenberg, Munich; Rainer Kossat, Aschau, both of Germany

[73] Assignee: Siemens Aktiengesellschaft, Munich, Germany

[21] Appl. No.: 138,436

[22] Filed: Oct. 20, 1993

[30] Foreign Application Priority Data

Oct. 20, 1992 [DE] Germany .......................... 42 35 313.0
May 19, 1993 [DE] Germany .......................... 43 16 874.4
Aug. 24, 1993 [DE] Germany .......................... 43 28 464.7

[51] Int. Cl.[6] ................................................. G01N 21/84
[52] U.S. Cl. ................................................. 356/73.1
[58] Field of Search ........................................ 356/73.1

[56] References Cited

U.S. PATENT DOCUMENTS

| 4,639,130 | 1/1987 | Koike et al. .................. 356/73.1 |
| 4,812,646 | 3/1989 | Waszkiewicz . | |
| 5,090,802 | 2/1992 | Longhurst ...................... 356/73.1 |

FOREIGN PATENT DOCUMENTS

| 0411956A2 | 2/1991 | European Pat. Off. .............. 356/73.1 |
| 58-18614 | 2/1983 | Japan ..................................... 356/73.1 |
| 58-198015 | 11/1983 | Japan ..................................... 356/73.1 |
| WO93/16363 | 8/1993 | WIPO . |

OTHER PUBLICATIONS

Hotchkiss "Automated Loss Measurement Sit for Optical Cables", Electronics test Jun. 1981, pp. 32–33, vol. 29, No. 13.
Abstract of Japanese publish application 62–91832 (Apr. 27, 1987), *Patent Abstracts of Japan,* Vol. 11, No. 299 (P-621) [2746], Sep. 28, 1987.

*Primary Examiner*—Vincent P. McGraw
*Attorney, Agent, or Firm*—Hill, Steadman & Simpson

[57] ABSTRACT

A method and apparatus for measuring a plurality of light waveguides includes a coupling device having an arrangement for conducting a light spot in a chronological succession along an infeed section of the plurality of waveguides for coupling light therein and an outcoupling region, wherein the reception radiation fields are acquired in terms of their chronological distribution and their chronological distribution is evaluated.

49 Claims, 12 Drawing Sheets

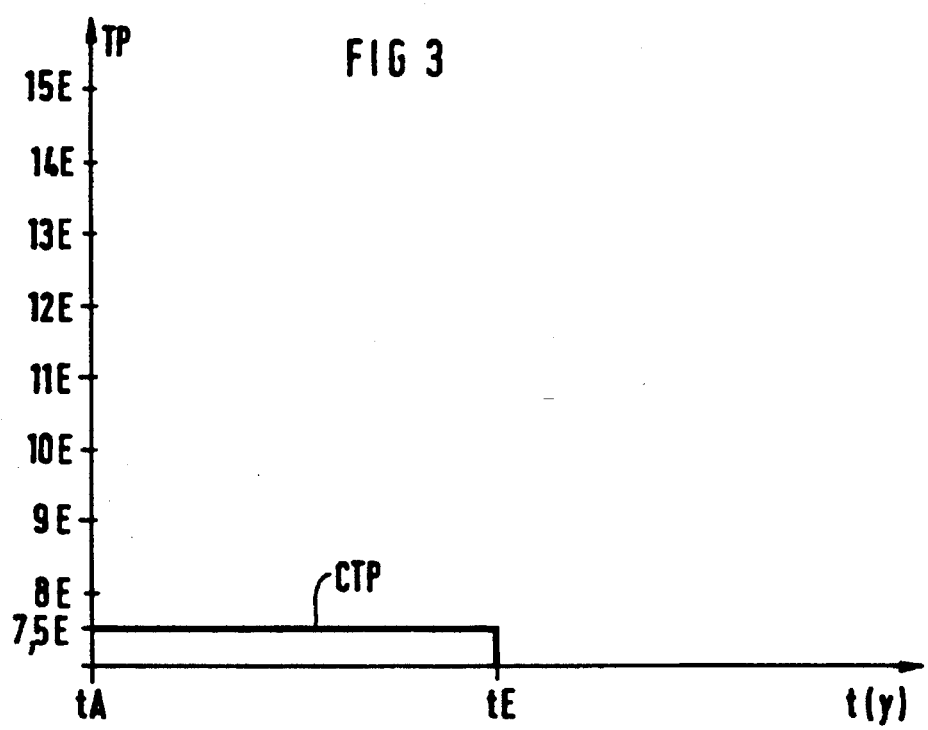
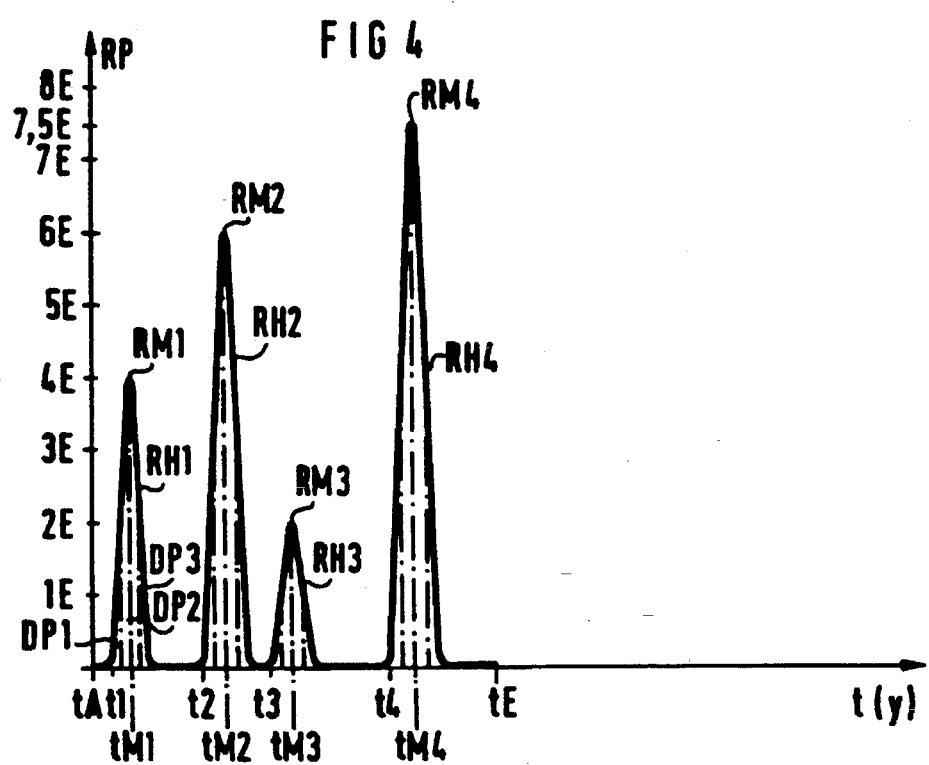

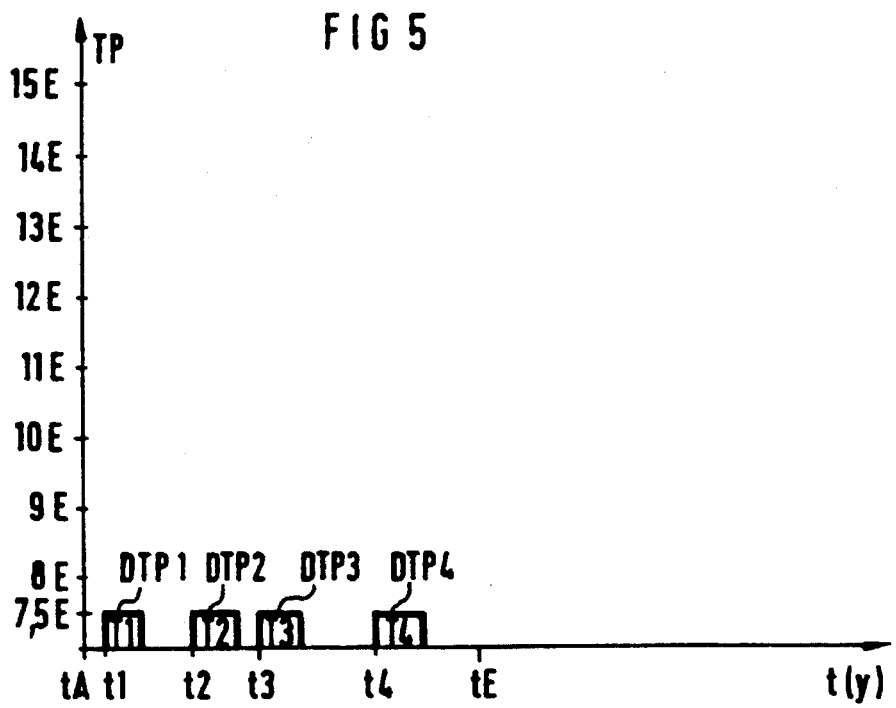
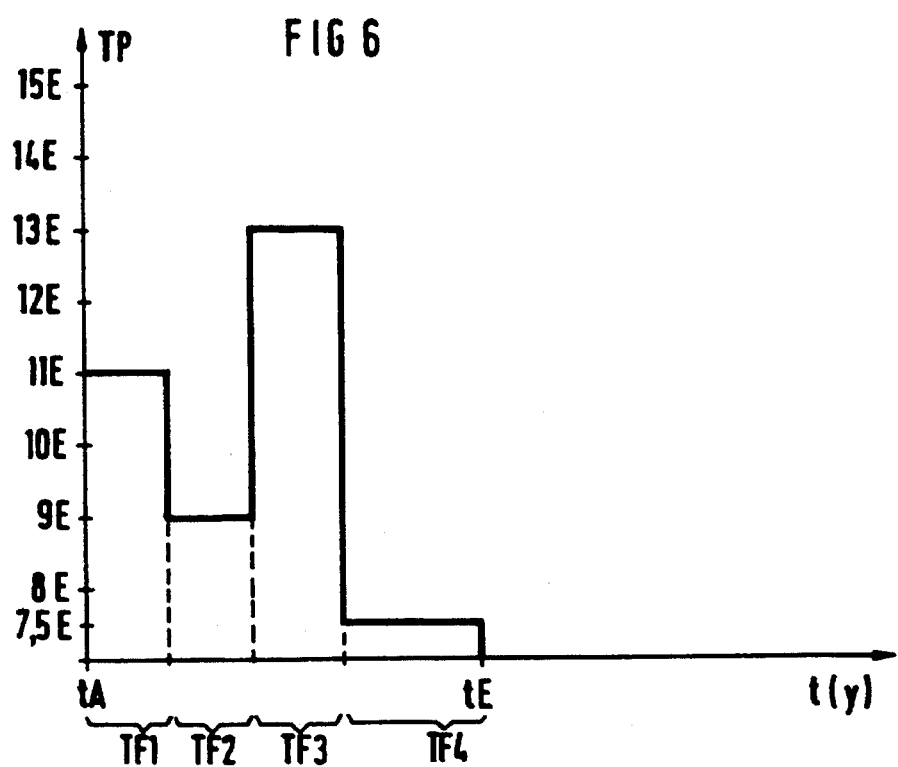

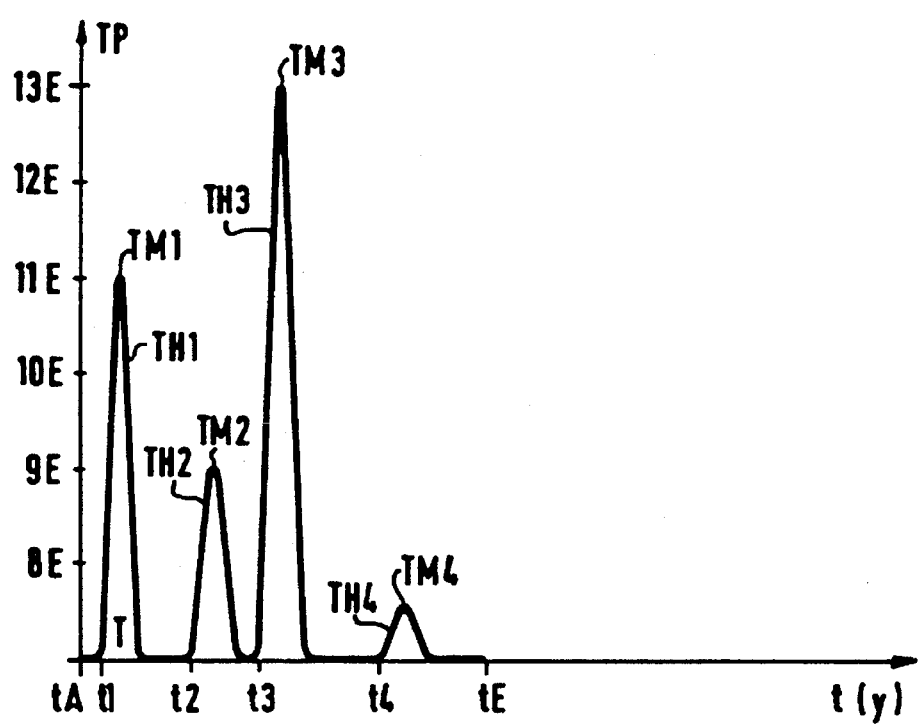
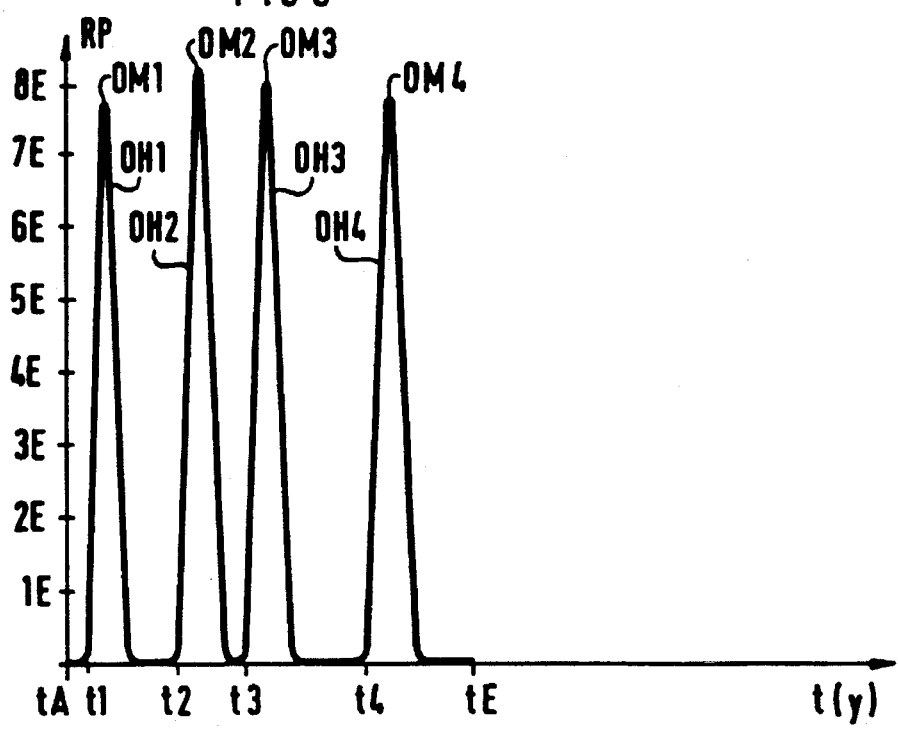

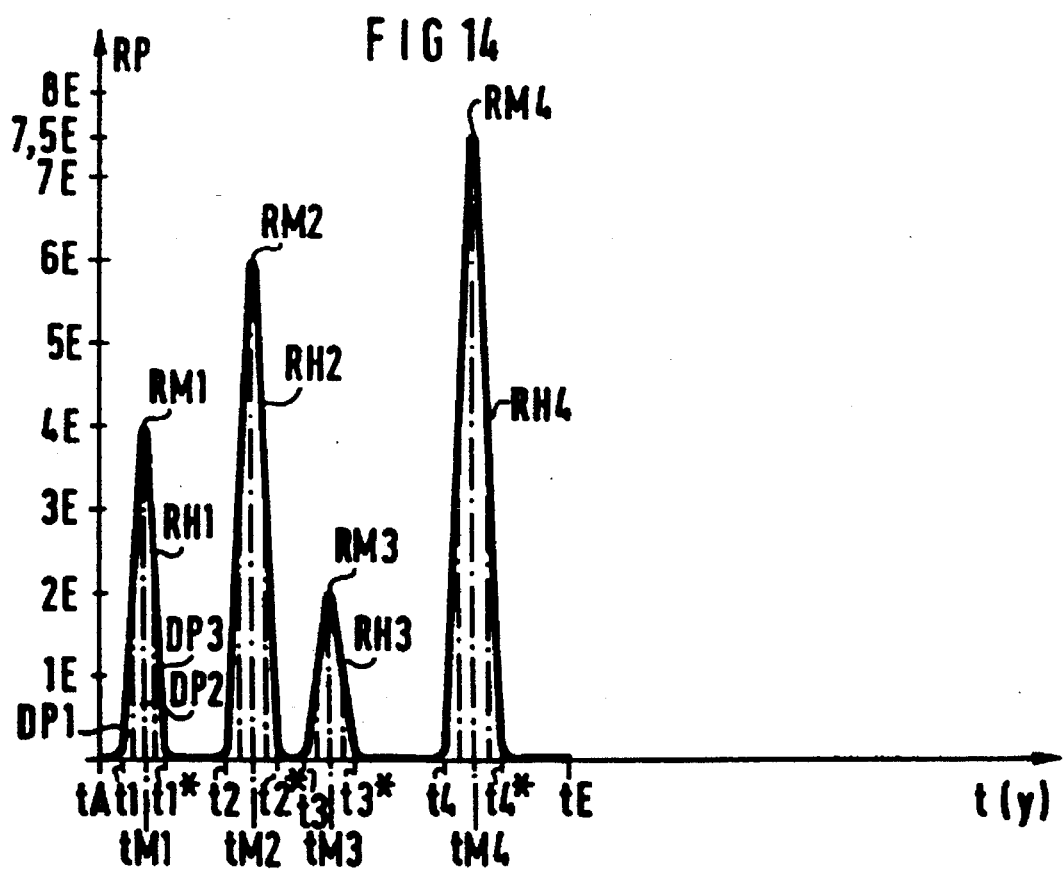

METHOD AND APPARATUS FOR OBTAINING MEASUREMENTS IN A PLURALITY OF LIGHT WAVEGUIDES

BACKGROUND OF THE INVENTION

The present invention is directed to a method for making measurements in a plurality of light waveguides, wherein the light is infed at the transmission side into each of the light waveguides to be respectively measured and wherein a part of the light is outfed and evaluated at the reception side.

U.S. Pat. No. 5,090,802, whose disclosure is incorporated herein by reference thereto and which claims priority from the same U.K. Patent Application as European Patent 0 411 956 A2, discloses a measuring means for evaluation a multi-fiber junction. This means comprises an optical switch whose switch path or, respectively, transmission channels have their end faces respectively firmly spliced to equidistantly arranged test light waveguides. At the transmission side, a test signal from an optical transmitter is, respectively, supplied into the switch paths of the optical switch in chronological succession and is picked up at a reception side with a reception element of an optical receiver and is separately evaluated. Since the optical transmitter is firmly connected to the optical switch and the test light waveguides are firmly connected to the switch paths or, respectively, transmission channels of the optical switch, the cost for coupling or uncoupling of the test light waveguide is high.

The known measuring means is directed and limited to a fixed coupling of the optical transmitter to equidistantly arranged test light waveguides. Given fluctuating or, respectively, varying coupling conditions, which can occur, for example, given optical transmission links having light waveguide ribbons with light waveguides that are not equidistantly arranged, and is due to different color applications or to different coatings of the light waveguides, this known measuring means is hard to use.

SUMMARY OF THE INVENTION

The object of the present invention is to provide a method and apparatus wherein the coupling conditions for measurements at a plurality of light waveguides can be improved in a simple way.

To accomplish this object, the present invention is directed to an improvement in a method for measurements of a plurality of light waveguides, which method includes coupling lights at an input side into each of the light waveguides to be measured and coupling out light at a respective reception side and evaluating this light. The improvements are creating a light spot of the transmission radiation field, moving the light spot in chronological succession across the infeed sections of the light waveguides to couple the light therein and the step of outcoupling includes individually acquiring the light coupled out of each of the waveguides in succession in their chronological distribution relative to one another and evaluating this chronological distribution of the outcoupled light.

In the method of the invention, a luminesce spot of the transmission radiation field on the input area of the waveguide is moved in chronological succession over the infeed sections of the waveguides to be measured and is, therefore, coupled therein. On the reception side, the radiation fields of the light waveguides to be measured are coupled out and acquired on the reception side in their chronological distribution relative to one another and this chronological distribution is then evaluated.

Compared to the rigid coupling of the transmission side of the light waveguides with the switches applied in the prior art, the invention offers a number of possibilities of acquiring additional information about, for example, the position of the waveguides and the condition of the waveguides. Over and above this, the type of coupling with a transmission radiation field pursued by the present invention can be substantially more simple and quickly realized in practice than the coupling with fixed optical lines and additionally inserted optical switches. As a result of the allocation between the transmission radiation field, on the one hand, and the reception radiation field, on the other hand, in view of their chronological distribution, more detailed information about, for example, the condition and position of the attenuation behavior, etc., of the individual light waveguides can be acquired and this information can, thus, be offered for further evaluation in a variety of applications.

In an expedient development of the invention, the topical position or location of the light waveguides is identified from the chronological distribution of the reception radiation fields and is offered for evaluation. The topical position or location of the waveguides plays a special part in various ways. For example, it can be important to know the topical position of the waveguide within the light waveguide ribbon, because this information can otherwise only be acquired with great difficulty in other ways.

In an expedient development of the invention, the light spot of the transmission radiation field at the transmission side is controlled with the chronological distribution of the reception radiation field. A type of "feed back" between the transmission reception side can thereby be produced so that the respective reception radiation field can be individually influenced for every light waveguide to be measured. The reception radiation field can be prescribed independently of the coupling conditions of the transmission and/or reception side in this way and can also be maintained in a controlled fashion within certain limits. This plays a part, particularly, for example, given measurements at a plurality of light waveguides that differ from one another in terms of their coupling properties. The reason for this, for example, can be different color applications, for example red, green blue; thickness of the color application that differ from one another; different coatings or, on the other hand, fiber geometries that differ from one another, for example core eccentricities. As a result of the chronological resolution of the reception radiation fields during the movement of the light spot over the infeed sections of the light waveguides to be measured, the coupling conditions of the transmission and/or reception side can be made largely independent of light waveguide positions, particularly in their core positions. The transmission radiation field need not respectively be in its specific spatial allocations to the light waveguide to be measured. This advantage is particularly significant given measurements in light waveguide ribbons and in optical ribbon conductors. The chronological sequence of these time intervals at which light is guided in the light waveguides to be measured during the movement of the light spot at the transmission side is determined from the measured, chronological distribution of the reception radiation field. The time intervals from this reference measurement each, respectively, approximately mark the location of the light-guiding light waveguide core. For following the actual measurements at the light waveguides, for example, the transmission radiation field can, thus, be switched or keyed in agreement with the registered sequence of light-guiding time intervals or infeed time intervals. The light spot at the transmission side, thus, illuminates the infeed sections of the light waveguides to be measured only during those specific infeed time intervals, whereas it is shut off in the other times of its movement. The infeed of the transmission radiation field with its light spot at the transmission side is, thus, implemented in a type of pulsed mode. Numerous possibilities in view of a better exploitation of the light emitted by the transmitter will occur. For example, the transmitter itself can be better utilized on the basis of the pulsed mode and the transmission radiation field can, thus, be supplied into the light waveguides to be respectively measured with a higher light power. Less light energy is, thus, wastefully lost. Under certain circumstances, the average light power required at the transmission side for the actual measurement can be reduced to a certain extent, so that problems of eye safety are potentially diminished, particularly when utilizing a laser as the transmitter element.

In an advantageous development of the invention, the topical position or location of the light waveguide that is identified can be displayed and/or registered. Such an application of the invention is of interest particularly when the position within the common envelope is to be continuously monitored and, potentially, registered within the framework of, for example, a manufacturing device for light waveguide ribbons. High demands are made on the exact position of the light waveguides within the ribbon, particularly in view of the necessary splicing procedures, because the splicing procedure can be correspondingly simplified and more exactly implemented only given a largely constant positioning of the light waveguides. The inventively acquired, simple statement about the spatial position of the light waveguides or, respectively, the light waveguide cores inventively acquired from the chronological distribution of the reception radiation fields will enable a simple implementation of the measurements for quality assurances. It is also of particular interest in this context that the statement of the invention also supplies a statement about the position of the light waveguide cores above all else. Thus, it should be pointed out that the identification of the position of the light waveguide cores can only be implemented in extremely difficult and relatively complicated way using other known methods. The reception radiation field of the individual light waveguides defined according to the present invention also lie at exactly the location where the cores of the light waveguides to be roughly aligned to one another lie later given, for example, a splicing procedure, so that the invention also directly enables a statement as to where the geometrically best light guidance occurs in the light waveguide.

According to another expedient development of the invention, the respective light waveguide power of the reception radiation fields is determined from the chronological distribution of the reception radiation field and is offered for evaluation. The additional information acquired in this way allows judgment, particularly in view of, for example, different transmission attenuations of the individual light waveguides, potential different positionings and allocations, as well as, for example, about the quality of the splice connection.

In an advantageous development of the invention, the light spot of the transmission radiation field can be controlled at the transmission side with these selectively registered light powers at the reception side. A specific transmission power, for example, can thereby be individually set for each light waveguide to be measured so that the specific power level or prescribed light power can be achieved for this waveguide at the reception side. Advantageously, the transmission side can thereby be particularly set so that the reception radiation field registered at the reception side differs only slightly from one another overall in terms of their light power. The signal-to-noise ratio is, respectively, individually improved in this way for those light waveguides to be measured, wherein the intensity of the reception radiation fields was originally low or, respectively, extremely low. Thus, an overdrive of the evaluation means of the reception side can also be avoided for those light waveguides that supply extremely high reception radiation fields. A complicated switching of the amplifier units in the receiver that is otherwise necessary, moreover, is also eliminated due to the setting of reception levels that are of approximately the same height.

In another expedient development of the invention, the light powers of the individual light waveguides identified in this way or manner can be displayed and/or registered. This is particularly of interest in those applications where, for instance, the quality of the splice connection that has already been carried out is to be judged. The measured, individual light powers that are displayed for the operator on, for example, a display means enables an immediate evaluation of the quality of the splice connection. In addition to an optical display, a continuous registration of the measured amplitude values can also be implemented.

The invention is also directed to an apparatus for measuring a plurality of light waveguides comprising an optical transmitter/coupling means that can be coupled to the light waveguides to be respectively measured and also comprises an optical receiver that has at least one reception element to which an evaluation means is connected. The improvement in this apparatus is that the transmission/coupling means is fashioned or constructed so that the light spot of the transmission radiation field at the transmission side can be respectively moved in chronological succession over the infeed sections of the light waveguides to be measured and can thereby be coupled thereto and in that the reception element in the optical receiver is aligned and fashioned so that the respectively acquired reception radiation fields of the light waveguides to be measured that are allocated to the infeed of the transmission side, generates reception signals therefrom and these are supplied to an evaluation means.

The invention is also directed to a method for the infeed of light into a plurality of light waveguides to be measured, wherein the light is supplied into the waveguides to be measured in chronological succession, and this method has the improvement that the transmission radiation field is spatially imaged so that the light spot has a greater spatial expanse in a direction extending perpendicular to both the propagation direction of the transmission radiation field and the scanning or sampling direction, which greater expanse is greater than the expanse in the scanning direction, and that the infeed sections of the light waveguides to be measured are illuminated in chronological succession with this light spot.

In that the spatial expanse of the transmission radiation field at the infeed location and, thus, its light spot is larger in a direction which extends both perpendicular to the propagation direction of the transmission radiation field and in the sampling or scanning direction than in this sampling direction of the light spot, the light spot extends non-uniformly perpendicular to the propagation direction of the transmission field and it is largely assured that the cores of the light waveguides are largely completely illuminated or covered, even given core positions that deviate from one another. An individual, exact guidance and alignment of the light spot to the respective light waveguide core, as required, for example, given extremely small, punctiform light spot on the order of magnitude of the light waveguide core of approximately 10 μm, is not required. On the contrary, light can be supplied into the core of the respective light waveguide with adequately high light power independently of the respective core position. Different core positions, for example due to tolerances or, respectively, fluctuations in the fiber geometries as well as due to coatings that have different thicknesses on the light waveguides to be measured, can, thus, not lead to a deterioration of the light infeed with this light spot. Due to the privileged direction of the light spot perpendicular to the propagation direction of the transmission radiation field, the cores of the light waveguides are reliably impinged or sampled by the migrating light spot and are respectively selectively individually optimally illuminated with optimum light power so that the light can be supplied into the cores with a high efficiency, for example a high light power. Since the light waveguides in a light waveguide ribbon have different diameters or can be surrounded by an outside sheath that differs in thickness so that the light waveguides assume different threedimensional positions in the ribbon, this imaging of the light spot is particularly significant given light waveguide ribbons.

In particular, the light spot for a reliable light infeed has an approximately thin oval, ellipsoidal or, respectively, strip-shaped geometry with a cross sectional form in the infeed plane perpendicular to the propagation direction of the transmission radiation and perpendicular relative to the sampling direction of the light spot.

The invention is also directed to an apparatus for the infeed of the light into a plurality of light waveguides to be measured, which comprises an optical transmission coupling means that can be coupled to the light waveguides to be respectively measured and this apparatus is characterized in that the means for imaging the transmission radiation fields are provided so that in the transmission coupling means, the light spot generated by them will comprise a greater spatial expanse in a direction extending perpendicular to both the propagation direction of the transmission radiation field and in the sampling direction than it extends in this sampling direction and it illuminates an infeed section of the light waveguide to be measured in a chronological succession.

In practically configured cases, the evaluation of the receive side of the offered, chronological distribution of the reception radiation field of a plurality of light waveguides to be measured can be made more difficult under certain circumstances. For example, receiver noise at the reception side can lead to measuring iraprecisions of the reception signals generated from the reception radiation fields. In addition, for example, slight irregularities in the movement of the transmission radiation field by the transmission side can lead to fluctuation at the reception side in the chronological position of the acquired reception radiation field, particularly given multiple passes, or multiple scans, of the transmission radiation fields, for example it can produce a type of "jitter effect".

A development of the invention is based on the object of disclosing a way of how the evaluation of the offered, chronological distribution of the reception radiation field of a plurality of light waveguides can be measured and can be improved in a simple way. This object is achieved in that the chronological distribution of the reception radiation field is registered and retained in at least one first pass of the transmission radiation field at the transmission side and in that a control event of the receiver side are triggered in subsequent measurements on the basis of this registration.

This development is particularly distinguished in that the chronological distribution of the reception radiation fields of the light waveguides to be measured is first registered and retained during a first scan of the transmission radiation field at the transmission side. Only then are the control events of the reception side for the following actual measurements triggered on the basis of this reqistration. SiGnificant test information about the light waveguides to be measured can, thus, be first acquired with the assistance of the first scan of the transmission side and the coupling condition at the transmission side and/or reception side can, thus, be set in a definite way for the actual following measurements. A largely exact evaluation of the offered multitude of test information from the chronological distribution of the registered reception radiation fields in subsequent measurements is, thus, enabled in a simple as well as reproducible way.

In particular, the chronological positions, or time slots, for example the infeed durations of the reception radiation fields can be measured in at least one first scan of the transmission side and the measured reception signals of the reception radiation fields can then be respectively integrated over these time slots in at least one second scan of the transmission side. The light powers of the reception radiation fields are available for further evaluation in this way, particularly for controlling the transmission power of the transmission radiation field individually for every light waveguide to be measured.

A development of the invention is also directed to an apparatus for measurements at a plurality of light waveguides comprising an optical transmission/coupling means that can be coupled to the light waveguides to be respectively measured and also comprises an optical receiver that has at least one reception element to which an evaluation means is allocated, wherein the transmission/coupling means is fashioned so that the light spot of the respective transmission radiation field at the transmission side can be moved in a chronological succession over the infeed sections of the light waveguides to be measured and can be coupled therein, and wherein the reception element in the optical receiver is aligned and fashioned so that this respectively requires reception radiation fields of the light waveguides to be measured allocated to the infeed of the transmission side in terms of their chronological distribution, will generate reception signals therefrom and supply the latter to the evaluation means, and this apparatus is then characterized in that the evaluation means comprises a central processor unit having an appertaining measured value memory such that the reception signals generated in at least one first scan of the transmission radiation field at the transmission side can be registered and control events at the reception side can be triggered with control means in subsequent measurements on the basis of this registration.

It may be potentially difficult in practice to couple light of a transmission radiation field into the core of at least one light waveguide to be measured based on a flex coupler principle along an infeed section proceeding in a curved path. The object of a development of the invention is, therefore, to disclose a way of how the infeed along an infeed section of a light waveguide to be measured which proceeds in a curved path can be better matched to practical conditions. This object is achieved in that the focusing surface or area of the transmission radiation field is inclined in a direction toward the infeed surface of the infeed section relative to an imaginary first plane extending perpendicular to the beam direction.

In that the focusing surface of the transmission radiation field is placed at an angle in the direction toward the infeed surface of the infeed section relative to the imaginary plane that extends perpendicular to the beam direction, the light of the transmission radiation field is essentially sharply imaged along nearly an entire infeed section of the light waveguide to be measured. The overshooting of the light waveguide core is largely avoided so that the infeed efficiency is significantly improved.

A development of the invention is also directed to an apparatus for infeeding light of a transmission radiation field into the infeed section of at least one light waveguide to be measured according to the flex coupler principle, and this is characterized in that at least one imaging means is provided that inclines the focusing surface of the transmission radiation field in the direction toward the infeed surface of the infeed section relative to an imaginary first plane extending perpendicular to the beam direction.

A development of the invention is also directed to a method for coupling light of a transmission radiation field into the infeed section of at least one light waveguide to be measured according to the flex principle which is characterized in that the light spot of the transmission radiation field moves back and forth along the longitudinal axis of the light waveguide to be measured.

In this context, the development of the invention is also directed to means which is characterized in that a deflection means is provided which moves the light spot of the transmission radiation field back and forth along the longitudinal axis of the light waveguide to be measured.

Other advantages and features of the invention will be readily apparent from the following description of the preferred embodiments, the drawings and claims.

BRIEF DESCRIPTION OF THE DRAWINGS

FIG. 3 is a graph of a first transmission level for the transmission side infeed according to FIG. 1;

FIG. 4 is a graph of the reception levels received with the transmission levels of FIG. 3;

FIG. 5 is a graph illustrating a second type of transmission levels for the transmission side infeed of FIG. 1;

FIG. 6 is a graph illustrating the third type of transmission levels for the transmission side infeed of FIG. 1;

FIG. 7 is a graph illustrating the fourth type of transmission levels for the transmission side infeed of FIG. 1;

FIG. 8 is a graph illustrating the reception levels belonging to the transmission levels of FIGS. 6 and 7;

FIG. 14 is an enlarged graphic view presenting the reception levels of four light waveguides to be measured given a transmission side linear beam deflection motion with the measuring instrument of FIG. 11;

DESCRIPTION OF THE PREFERRED EMBODIMENTS

Figure 1:
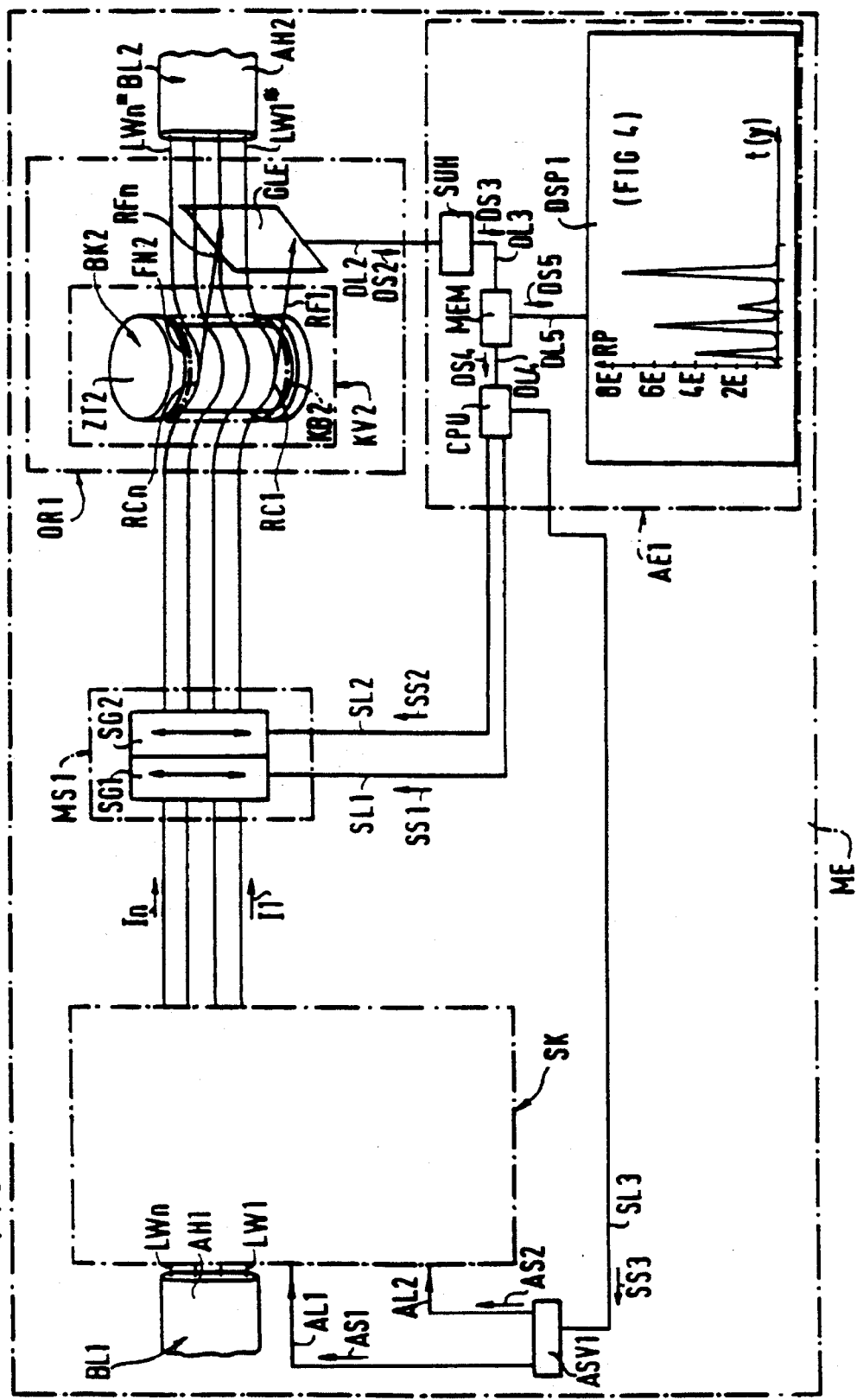
FIG. 1 is a schematic overall diagram with portions in partial perspective of a measuring instrument for the implementation of the present invention for utilization in the method of the present invention.

The principles of the present invention are particularly useful when incorporated in a measuring instrument or means, generally indicated at ME in FIG. 1.

The measuring instrument or means ME has components which include a transmission/coupling means SK having an optical transmitter OT1 together with the appertaining coupling means KV1 (see FIG. 2), a drive means ASV1 (FIG. 1) allocated to the means SK, an optical receiver OR1 and an evaluation means AE1. These components can expediently be combined with a multiple splicing means MS1 (framed with broken lines) to form a portable testing unit of, for example, a light waveguide splicing device or of an attenuation measuring device. In addition to being utilized for this especially advantageous application, the invention can also be utilized for the selective identification of additional optical transmission characteristics such as, for example, phase running times, pulse responses, line attenuations, etc. The invention can also be utilized in a number of additional problem areas of multiple-fiber technology such as for identifying light waveguides, for manufacture control and manufacture monitoring of light waveguide ribbons, for quality control, for identifying fiber geometries and optical quality properties, etc. The transmission and/or splice attenuation measurement in light waveguide splicing devices shall be respectively referred to for the following comments.

In FIG. 1, a first ribbon conductor or light waveguide ribbon BL1 which has light waveguides LW1 through LWn and a second light waveguide ribbon or ribbon conductor BL2, which has light waveguides LW1* through LWn*, are held opposite one another in the multiple splicing means MS1 to be welded or joined together. The light waveguides LW1 through LWn of the ribbon conductor BL1 are embedded nearly parallel in a flat, outer envelope AH1 of plastic material which envelope is approximately rectangular in cross section and is shown in the left-hand part of FIG. 1 and has been omitted in the other part of the figure for the sake of clarity. Corresponding thereto, the light waveguides LW1* through LWn* of the ribbon conductor BL2 are surrounded by a similarly fashioned, outer envelope AH2 that is only indicated in the right-hand part of FIG. 1 and has also been omitted in the rest of the Figure. At least a partially optical transparent material is expediently selected for the outer envelopes AH1 and AH2 in order to assure a largely low-attenuation infeed and/or outfeed of light.

In order to couple light into the light waveguides LW1 through LWn at the transmission side, the transmission/coupling means SK is coupled to an arbitrarily prescribable line section of the ribbon conductor BL1 in the left-hand part of FIG. 1. Up to the light infeed, the light waveguides LW1 through LWn—as may be seen from FIG. 2—are guided approximately arcuately or, respectively, curved in a coupling means or device KV1. To this end, an approximately cylindrical bending arbor ZT1 of a flex coupler BK1 is provided in the present exemplary embodiment. The flex coupler BK1 comprises a guide groove FN1 at the circumference of the cylinder ZT1 for the lateral positional securing or, respectively, for the guidance of the ribbon conductor BL1. The width of this guide groove FN1 roughly corresponds to the width of the ribbon conductor placed in it or, respectively, to the light waveguide ribbon BL1.

The transmission/coupling means or input coupling means SK include an optical transmitter OT1. The optical transmitter OT1 comprises at least one transmission element or light generator TE, for example a laser diode or a laser, which, in the illustrated exemplary embodiment, emits a nearly parallel light beam or a parallel ray LB of k light rays with a transmission power TP in the direction of a rotatable or, respectively, pivotable mirror BS provided as deflection means. For the sake of clarity, only three of the k light rays LS1 through LSk of the light beam LB are illustrated in FIG. 2.

In the optical transmitter OT1, the light beam LB impinges on the rotatable mirror BS which has a mirrored surface VO and is placed transversely or, respectively, tilted relative to the main emission direction. The light rays LS1 through LSk are reflected by the mirrored surface VO and are deflected nearly parallel side-by-side onto an infeed optics EO, particularly a lens system, between the optical transmitter OT1 and the coupling means KV1. The infeed optics EO bundles or focuses the light rays LS1 through LSk to form a transmission radiation field SF, whose light spot LF is imaged in an infeed region or, respectively, coupling region KB1 of the flex coupler BK1. The coupling region KB1 wherein the light waveguides LW1 through LWn are guided in a curved path is framed with broken lines in FIG. 2.

An infeed plane is defined in this coupling region KB1 with a y, z coordinate system. The infeed plane erected by the y axis and z axis lies roughly perpendicularly relative to the plane of the drawing and, thus, perpendicularly relative to a propagation direction x of the respective transmission radiation field SF. The y-axis thereby identifies a scan direction for the light spot or luminesce spot LF transversely relative to the longitudinal direction or axial extent of the ribbon conductor BL1. In the infeed plane yz, the light spot LF preferably has a nearly strip-shaped or, respectively, line-shaped or thinly oval shape (see FIGS. 9 and 10). Mirrors or suitable diaphragms (for example, a slotted diaphragm) can be provided as imaging means for the transmission radiation field SF in the beam path of the light beam LB for generating the light spot LF. Tolerances in the position of the light waveguides, preferably in z-direction as can be produced, which tolerances are due to a varying ribbon thickness or due to differences in the light waveguide diameters, can thereby be reliably compensated. To that end, a spatial expanse for the light spot LF in the z-direction is selected at the infeed location or, respectively, in the infeed plane that is advantageously at least equal to half the thickness of the light waveguide ribbon BL1, and, for example, between 100 µm and 200 µm. An expanse of the light spot LF in the z-direction at the infeed location generally suffices on the order of magnitude of the thickness of either the light waveguides or the light waveguide ribbon BL1. The illumination field breadth of the light spot LF in the scan direction y is preferably selected smaller at the infeed location than the light waveguide outside diameter (particularly, for example, below approximately 250 µm), so that light can be supplied into the respective light waveguide core with a high light power. The beam width of the light spot LF in the y-direction at the infeed location should be expediently selected at least equal to the core diameter of the respective light waveguide, particularly in the case of an alignment of the transmission radiation field to the respective light waveguide core already occurs at the infeed location and the transmission radiation field is stationary at the respective infeed location. In the case of a steadily migrating transmission radiation field over the respective infeed location, the beam width of the light spot LF in the y-direction is also advantageously selected smaller than the core diameter of the respective light waveguide, so that the preferably line-shaped light spot LF continuously sweeps and illuminates the core of the respective light waveguide during the beam movement across the infeed location. Emission losses in the spaces between a light waveguide core and the next adjacent light waveguide core can thus be largely avoided. The transmission radiation field SF expediently has an approximately oblong illumination field at the infeed location in the three-dimensional, the spatial expanse thereof being selected greater in z-direction than in scan direction y. Further details regarding the spatial shape of the light spot LF are described and illustrated in FIGS. 9 and 10.

Figure 2:
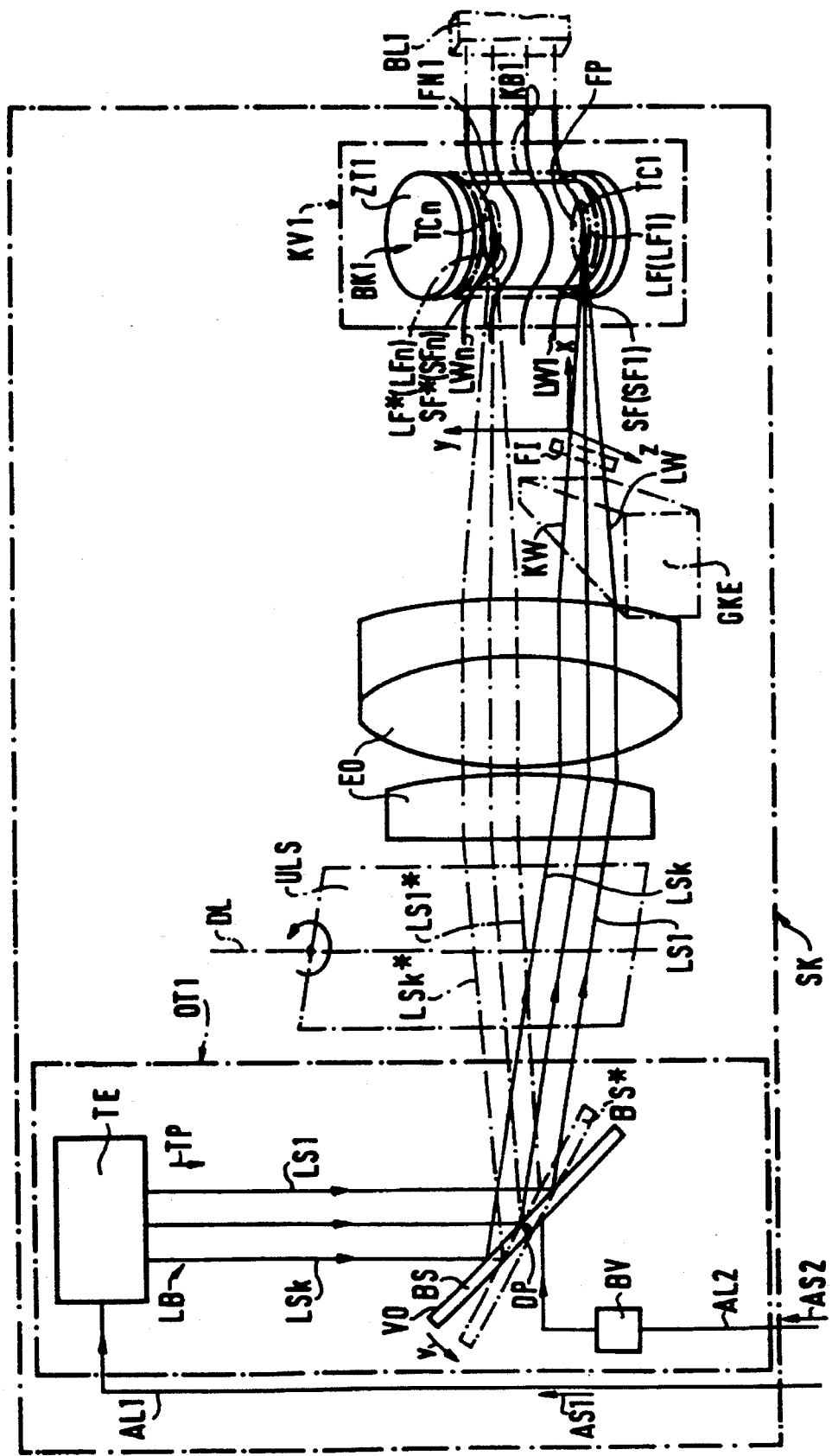
FIG. 2 is a schematic diagram with portions illustrated in perspective view of the transmission side coupling arrangement of the device of FIG. 1.

FIG. 2 shows a slanted position of the rotatable mirror or deflection mirror BS, whereby the transmission radiation field SF has its light spot or luminesce spot LF illuminating, for example, an infeed section TC1 along the curved light waveguide LW1 and is supplied nearly tangentially into the core thereof. The respective infeed section, for example TC1, and, thus, the actual infeed location into the core of the respective light waveguide, for example, LW1, is thereby expediently illuminated in the end region of the curvature of the respective, arcuately guided light waveguide, for example LW1, at the transition to its straight-line line section, so that emission losses or, respectively, an undesired light outfeed due to a further, curved course of the light waveguide are largely avoided. The actual infeed location for the light infeed is expediently allocated approximately to a curvature angle of 8° deviating from that location along the curved light waveguide, for example LW1, at which the light waveguide lifts off from the cylindrical bending arbor ZT1 of the flex coupler BK1 and departs it on a straight line.

The infeed section, for example, TC1 is impinged by the light spot LF thereby expediently extends up to a length of approximately 1 mm along the respective light waveguide, for example LW1. The illuminated infeed section TC1 is indicated with a roughly oval framing entered with broken lines. A transmission radiation field SF1 having a light spot LF1 is individually allocated in an unambiguous way only to the light waveguide LW1 in this coupling position of the transmission radiation field SF with its light spot LF.

The obliquely placed deflection mirror BS is now turned or tilted around a pivot point DP in the beam path of the light beam LB by an actuation means BV so that the angle of the mirror BS relative to the light rays LS1 through LSk is varied. The actuation means BV is connected to drive means ASV1 (FIG. 1) by a control line AL2 and is operated by the drive means ASV1 with a control signal AS2 applied to the control line AL2. The drive of the actuation means BV, for example, occurs in such a way that the deflection mirror BS, which is illustrated in a position for coupling light into the light waveguide LW1, is continuously or steadily turned at least into an infeed position BS* (shown with broken lines) for coupling light into the light waveguide LWn. The rotary motion of the mirror BS around the pivot point DP in the beam path of the light beam LB is symbolically indicated by an arrow v. Due to the steady rotational motion of the mirror BS, the light rays LS1 through LSk are deflected or pivoted and are imaged by the infeed optics EO so that the appertaining transmission radiation field SF linearly sweeps or illuminates the coupling or curvature region KB1 in a chronological succession. A rastered, i.e. step-by-step rotation of the deflection mirror BS can likewise be expedient, so that the transmission radiation field SF with the light spot LF will scan the coupling region KB1 in steps or in stages. Given a step-by-step scanning with the light spot LF, the scanning steps are expediently selected equal to or smaller than the spacing between two neighboring light waveguide cores. The transmission radiation field SF moves translationally parallel to the plane in which the light waveguides LW1 through LWn lie so that it traverses or scans the entire coupling region KB1 in a scan direction y with its light spot LF in a chronological succession. The angular change effected by the rotatable mirror BS is thus converted into a linear displacement of the light spot LF in the y-direction. The light spot LF of the transmission radiation field SF, for example beginning with the light waveguide LW1, migrates steadily or in steps over the coupling region KB1 in the y-direction toward the light waveguide LWn. Thus, as illustrated in FIG. 2, due to the rotational motion of the deflection mirror BS, the transmission radiation field SF scans from bottom to top across the coupling region KB1 transversely relative to the axial extent of the curved light waveguides LW1 through LWn. The upper coupling position of the transmission radiation field SF is illustrated with light rays LS1* through LSk* indicted with broken lines that are allocated to the rotated deflection mirror in mirror position BS*. The transmission radiation field belonging thereto is referenced SF* and its light spot is reference LF*. As a transmission radiation field SFn with appertaining light spot LFn individually allocated to the light waveguide LWn, the transmission radiation field SF* with its light spot LF* is thereby supplied approximately tangentially into the core of the light waveguide LWn.

In order to be able to couple distinguishable test signals I1 through In (see FIG. 1) with optimally high intensity and/or light power into the light waveguides LW1 through LWn to be measured, the light spot LF of the transmission radiation field SF is preferably sequentially supplied only into one of the light waveguide cores and not into a plurality of cores during its motion in the scan direction y. One transmission radiation field SF1 through SFn having a respective, individual light spot LF1 through LFn that illuminates the curved light waveguide LW1 through LWn along appertaining infeed sections TC1 through TCn is thus unambiguously allocated to each light waveguide LW1 through LWn.

The rotational axis of the mirror BS, on the one hand, and the infeed regions TC1 through TCn, on the other hand, are thereby each respectively expediently arranged approximately in the focal points of the infeed optics EO in order to achieve an optimally focused infeed light of high power.

Viewed overall, a chronological resolution and/or selective activation of the individual light waveguides LW1 through LWn to be measured is achieved due to the selective infeed as a result of the swivel motion of the transmission radiation field SF at the transmission side. The actual spatial position of the light waveguides to be measured thereby plays no part.

A rotating mirror can also be employed instead of the turnable deflection mirror BS. In addition, a beam deflection system having a linearly moving mirror or a movement of the transmission element itself come into consideration, this requiring a correspondingly adapted infeed optics EO. Instead of the beam deflection means, a beam blanking means, for example a continuous slotted diaphragm, can likewise be employed. For example, self-resonance scanners, which include torsion rod scanners and torsion band scanners, galvanometer scanners, piezoelectric scanners, etc., are suitable as drive elements for the actuation of the beam deflection means. Whereas self-resonance scanners have a fixed frequency, the frequency is variable given galvanometer scanners and piezoelectric scanners. The drive elements also differ in terms of the wave images with which a scanning is possible. Potential disturbances of the mechanical beam deflection means can also be advantageously avoided by employing an acousto-electro-optical deflection element.

As warranted, the test signals I1 through In can also be directly supplied via the open end faces of the light waveguides LW1 through LWn to the respective cores if the end faces are accessible. The test signals I1 through In in FIG. 1 can advantageously derive from a separately provided test transmitter such as, for example, the transmission element TE but can also be message signals from the light waveguides LW1 through LWn. A plurality of transmitter elements that are preferably combined in the form of a line, as illustrated in copending U.S. application Ser. No. 08/099, 941 or an array (transmitter field) can be advantageously provided in the optical transmitter OT1 for selective, discriminatable infeed of the test signals I1 through In. A selective test signal infeed can then be advantageously achieved by a drive of these transmitter elements with the drive means ASV1 in a multiplex operation. What is then valid for the plurality of transmitter elements with reference to the plurality of light waveguides LW1 through LWn to be measured is: with a larger number of transmitter elements, the obtainable chronological resolution is all the greater so that the approximation to the continuous or steady light infeed of FIG. 2 described therein is all the greater. To that end, at least the same number of transmitter elements would be expediently provided as there are light waveguides to be measured. In general, approximately two through four times as many transmitter elements suffice.

In FIG. 1, the infed test signals I1 through In run in the light waveguides LW1 through LWn to be tested via the multiply splice means MS1 to the reception side. At the reception side, the instrument ME has an optical receiver OR1 with a second coupling means KV2 and some of the signals are outfed in approximately tangential direction with a second flex coupler BK2 of the second coupling means KV2, which is constructed analogously to the coupling means KV1. The light waveguides LW1* through LWn* of the second ribbon conductor BL2 are thereby placed in a curved path around a cylinder ZT2 in a guide groove FN2, analogous to the transmission side. As a result thereof, reception radiation fields RF1 through RFn allocated to the transmission radiation fields SF1 through SFn and which are respectively individually allocated to the light waveguides LW1 through LWn to be measured emerge from their cores along arcuate outfeed sections RC1 through RCn into the coupling region KB2 of the flex coupler BK2. Since the test signals I1 through In are selectively produced in chronological succession in the cores of the light waveguides LW1 through LWn due to the displacement motion of the light spot LF, their allocated reception radiation fields RF1 through RFn also appear in a corresponding, chronological sequence, i.e.: the reception radiation field RF1 for the light waveguide LW1 is received first. The reception radiation fields RF2 through RFn-1 subsequently follow in sequence until, finally, the radiation reception field RFn allocated to the light waveguide LWn arrives in the coupling region KB2 and emerges therefrom. The reception radiation fields RF1 through RFn are at least partially acquired or registered in a chronological succession, for example sequentially, by a common, light-sensitive element GLE that is preferably stationarily arranged. The radiation fields RF1–RFn are convened by the element GLE into a respective electrical test signal DS2. Given digital signal evaluation, the test signal DS2 is transmitted on a signal line DL2 to a digitization element SUH of an evaluation means AE1. This digitization element SUH samples the electrical test signals DS2 arriving in a chronological succession in short time intervals, digitizes these samples and transmits digitized test signals DS3 via a line DL3 to a test value memory MEM in the evaluation means AE1. The digitized test data are forwarded from this test value memory MEM as a signal DS5 via a line DL5 to a display means DSP1, for example a display, and are visually displayed thereat.

Given employment of a large-area reception element GLE that covers all light waveguides to be measured, it is not necessary at the reception side, for example, to displace the reception element GLE for a selective, discriminatable pick-up of the reception radiation fields RF1 through RFn corresponding to the light waveguides LW1 through LWn activated in the chronological succession. An individual alignment of the reception element GLE to the respectively activated light waveguide is thus eliminated. For a farther-reaching topical or spatial resolution of the reception radiation fields RF1 through RFn, however, it may nonetheless be advantageous to apply a plurality of reception elements, particularly in a line or an array form and preferably stationarily, instead of the common reception element GRE. For example, traditional photodiodes, CCD elements, diode arrays, diode lines, etc., are suitable as reception elements.

For identifying and evaluating the coupling conditions in the measuring means ME, at least one reference measurement is expediently implemented first. To this end, the transmission radiation field SF of the transmission side can have a transmission level TP that exhibits an arbitrarily prescribable chronological curve. In FIG. 3, for example, the transmission side is operated with an approximately chronologically constant transmission level CTP. Therefore, while the light spot LF is migrating over the coupling region KB1 of the flex coupler BK1, the light spot LF illuminates the infeed sections TC1 through TCn belonging thereto along the curved light waveguide LW1 through LWn with a nearly constant transmission power or a nearly constant transmission level CTP. The chronologically constant intensity and/or power distribution TP for the transmission radiation field SF shown in FIG. 3 is entered continuously over the displacement time t which is required for the spot LF during the displacement motion of the spot LF beginning at the light waveguide LW1 at time tA roughly to beyond the light waveguide LWn at time tE. The displacement time t thereby corresponds to the displacement path y. During the chronological duration tEtA, the light spot LF migrates across the coupling region KB1, so that the infeed sections TC1 through TCn are each respectively irradiated by the light spots LF1 through LFn individually allocated to them and having a chronologically constant illumination field strength of approximately CTP=7.5 E, wherein 1E=1 light unit. The transmission radiation fields SF1 through SFn, which are individually allocated to the light waveguides LW1 through LWn and which effectively take effect for each waveguide, thus have a constant transmission level in the displacement time interval tE–tA.

At the reception side, an appertaining, chronological intensity or power distribution (see FIG. 4), for example a chronological distribution RP, is registered during the chronological duration tE–tA in the optical receiver OR1 in succession for the reception radiation fields RF1 through RFn, in the same way that it occurs due to the sequential infeed at the transmission side of the transmission radiation field SF or due to the individually allocated transmission radiation fields SF1 through SFn. The light infeed thereby begins at the light waveguide LW1 and ends at the light waveguide LWn, whereby n=4 applies here. Given a nearly linear displacement motion of the light spot LF, the chronological distribution RP of the reception radiation fields RF1 through RFn thereby approximately corresponds to the topical position or location of the light waveguides, particularly the location of the light waveguide cores.

The chronological distribution or the reception level RP of the reception radiation fields RF1 through RFn with n=4 is entered in the display means DSP1 of the evaluation means AE1 as well as in the appertaining, enlarged illustration of FIG. 4. Given a transmission-side pass of the transmission radiation field SF, selective, distinguishable reception levels RH1 through RH4 appear in chronological succession in the display means DSP1 and these levels are respectively individually and unambiguously allocated to the light waveguides LW1 through LW4. Given digital signal evaluation, the selective reception levels RH1 through RH4 each represent envelopes or interpolations for the digitized, sampled test signal, and the levels correspond to the chronological distribution of the reception radiation fields RF1 through RF4 given a continuous or steady infeed at the transmission side. For example, the reception level RH1 allocated to the light waveguide LW1 includes three discrete reception values DP1, DP2 and DP3 that are entered in broken lines. Corresponding to the total of four light waveguides LW1 through LW4 of the conductor BL1 or the four waveguides LW1* through LW4* provided in the ribbon conductors BL2, four different envelopes RH1 through RH4, that may be potentially different and that each respectively have three discrete reception values, are provided and the maximums of the envelopes RH1 through RH4 are referenced RM1 through RM4.

The four envelopes or reception levels RH1 through RH4 differ here in terms of their chronological position relative to one another as well as on the basis of their maximums RM1 through RM4 of different sizes, i.e. on the basis of their level fluctuations. By way of example, the maximums RM1 through RM4 of the reception levels RH1 through RH4 thus have the following values at times tM1 through tM4 on the reception power scale for the chronological distribution RP.

RM1=4 E;

RM2=6 E;

RM3=2 E;

RM4=7.5 E;

wherein 1E=1 light unit. The maximum RM4 is a boundary case with 100% infeed and outfeed.

The reception radiation field RF3 allocated to the light waveguide LW3 has the reception level RH3 with the lowest maximum RM3, whereas the reception radiation field RF4 allocated to the light waveguide LW4 has the highest reception level RH4 at RM4=7.5 E within the group of four light waveguides LW1 through LW4 to be measured. Whereas light is infed, guided and outfed nearly ideally, i.e. without attenuation losses, in the light waveguide combination LW4/LW4*, the light waveguide pair LW3/LW4* has the highest attenuation. There are thus differences in the height of the reception levels RH1 through RH4 and/or their maximums RM1 through RM4, whereby a maximum level fluctuation by the factor RM4/RM3=3.75 occurs for the maximums RM4 and RM3.

It may also be seen from the graphic presentation of the chronological distribution RP of FIG. 4 that the reception level and/or the intensity/power distribution RH3 is offset somewhat toward the left toward the reception level RH2 and does not lie centrally between the two reception levels RH2 and RH4. Since, given an ideally time-linear beam motion, the chronological distribution RP of the reception radiation fields RF1 through RF4 largely corresponds to the topical or spatial distribution or position of the cores of the light waveguides LW1 through LW4. Thus, by using the location of maximum light guidance, it can be concluded from the chronological distribution RP that the light waveguide LW3 or, respectively, LW3* spatially lies somewhat displaced toward the light waveguide LW2. This relationship between the time and the topical or spatial position of the light waveguides is also established given step-by-step scanning with identical scanning steps. Non-linear scan motions of the transmission beam are also possible as long as there is a defined relationship between the infeed at the transmission side and the outfeed at the reception side.

The maximum RM1 through RM4 of different heights as well as the nonequidistant position of the power or, respectively, reception levels RH1 through RH4 can have different causes. These causes include the coupling factors either at the transmission side, at the alignment location in the multiple splicing means MS1, or at the reception side can individually differ from one another for every individual light waveguide to be measured. Thus, for example, different colorations of the light waveguides in the ribbon conductor BL1 or BL2, such as, for example, red, green, yellow, blue, or color applications of different thicknesses as well as different coatings can result in different coupling factors, and different infeed and outfeed attenuations for each light waveguide. Differences in the coupling factors, for example, can also arise in that light waveguides from different manufacturing or drawing process batches and, thus, potentially different light guidance properties and fiber geometries are present in the fibers that are combined to form a light waveguide ribbon. In addition, the coupling conditions are also influenced by the positional tolerances of the light waveguides in the curvatures of the flex couplers. The level differences or level fluctuations (10 dB are typical) would make amplifications that differ from light waveguide to light waveguide necessary at the reception side in the optical receiver OR1. Changing to individual gain factors for every individual light waveguide would therefore mean an additional, high electronic as well as time outlay. Moreover, since an optimum level control can respectively be implemented only for one of the light waveguide combinations and, due to the small dimensions of the light waveguide cores, only relatively low light powers can usually be coupled into the light waveguide cores at the transmission side and be conducted therein, only a relatively poor signal-to-noise ratio would occur because of the fluctuations of the reception level or of the chronological distribution RP at the receiver side.

On the other hand, the chronological distribution RP is also influenced by the topical or spatial position of the light waveguides LW1 through LW4 in the ribbon conductor BL1 or by the topical or spatial position of the light waveguides LW1* through LW4* in the ribbon conductor BL2 as well as by their allocation or position to one another in the multiple splice means MS1.

In order to make, for example, the following, actual measurements at the light waveguides LW1 through LWn or LW1* through LWn* largely independent of these coupling conditions in the measuring means or equipment ME of the invention in a first application, the chronological distribution RP of the reception radiation fields RF1 through RFn is expediently evaluated with, for example, a central processor unit CPU in the evaluation means AE1 of FIG. 1 and is utilized for following, actual measurements for optimum infeed at the transmission side. To that end, the central processor unit CPU of the reception side is connected to the drive means ASV1 of the transmission side for the transmission/coupling means SK by a line SL3, so that the transmission side has "feed back" from the reception side (see FIG. 1). The drive means ASV1 receives control signals SS3 via the line SL3 from the central processor unit CPU and converts these into control signals AS1. The drive means ASV1 controls the optical transmitter OT1, and preferably the transmission element TE thereof, with these control signals AS1 which are carried on a line AL1.

A number of control criteria come into consideration for improving the infeed at the transmission side; these can be acquired from the chronological distribution RP of FIG. 4 as information about the condition of the light waveguides LW1 through LWn or LW1* through LWn*, particularly about their coupling conditions.

1. It proceeds from the chronological distribution RP of FIG. 4 that light is not beamed into the cores of the light waveguides LW1 through LWn, with n=4, at all times tin the time interval tE–tA during the displacement motion of the transmission radiation field SF. At what infeed times or at what time intervals light power is guided in the light waveguide cores at all can thus be determined from the chronological distribution RP.

For determining infeed times, respective leading edges of the reception levels RH1 through RH4 are sought, for example, in the chronological distribution RP of FIG. 4. Their intervals from the starting time tA of the infeed of the transmission side thus determine those infeed times t1, t2, t3 and t4 from which light is in fact coupled into the cores of the light waveguides LW1 through LW4. For this reason, it is already adequate for the operation of the measuring equipment ME to key the transmission element TE with the drive means ASV1 in accord with the chronological sequence of the reception radiation fields RF1 through RFn at the reception side (see FIG. 5), for example to switch the element TE on only at the infeed times t1, t2, t3 and t4, to emit the light LB during a defined chronological duration or during an infeed time interval T1 through T4 and to then deactivate the element TE in turn. The chronological sequence of the transmission side for light infeed is thus matched to the chronological sequence or distribution of the reception radiation fields that was previously registered at the reception side. The infeed time intervals T1 through T4 are thereby preferably only selected of roughly the same length as light is also in fact incident upon or impinges the infeed sections TC1 through TC4 (i.e. the cores) of the light waveguides LW1 through LW4. Expediently, the transmission radiation field SF during infeed time intervals (for example, T1) is respectively coupled into the light waveguides LW1 through LWn to be measured between 1 and 10% of the durations tE–tA of the movement of the light spot LF. Time intervals such as, for example, t2–t1 between 3% and 30% of the overall duration tE–tA of a pass of the light spot LF are respectively expediently selected for the successive infeed points t1 through t4 of the transmission radiation field SF.

FIG. 5 illustrates this pulse-like activation and deactivation of the transmission element TE with the drive means ASV1. During its displacement motion over the free space between two neighboring light waveguides, the chronological source TP of the transmission radiation field SF thus respectively comprises a transmission pause. The duration of the infeed time intervals T1 through T4 during which the transmission element TE is activated and, thus, the radiation field SF couples light into the light waveguides LW1 through LW4 given a steady movement of the light spot is dependent on the speed with which the beam deflection means deflects the beam across the individual fibers and, given an expedient, periodic actuation, is thus dependent on the frequency and amplitude thereof but is also dependent on the geometry of the luminesce spot LF. Given an expedient selection of the size of the luminesce spot and of the amplitude and given an assumed repetition rate of, for example, 1 kHz, the transmission radiation field SF is coupled into the light waveguides LW1 through LWn, with n=4, between 10 and 100 µs in the infeed time intervals T1 through T4, whereby time intervals between 20 and 300 µs occur for the infeed times t1, t2, t3, t4.

What is achieved by the designational drive, i.e. activation or, respectively, deactivation of the transmission element TE is that the power of the transmission element TE can be substantially better exploited. Since it is mainly thermal effects that limit the maximally usable power given standard transmission elements such as, for example, light-emitting diodes or semiconductor lasers, the transmission element TE is stressed far less due to the pulse mode. Therefore, the transmission element TE is respectively activated only during the short infeed time intervals T1 through T4, so that it can be operated with increased current during the short on-times T1 through T4 and a higher light power can thus be coupled into the light waveguide cores. Since the optical transmitter OT1 does not emit light in a continuous operation, an average lower light power can advantageously be produced, so that problems of eye safety can advantageously be countered, particularly given employment of a laser as the transmission element.

It is thus sufficient for the operation of the measuring instrument or means ME that the chronological distribution of the transmission level TP during the motion of the light spot LF over the coupling region KB1, for example during the time span tE–tA, respectively illuminates the infeed sections TC1 through TCn with individual transmission levels DTP1 through DTP4 with chronological limitation in the infeed time intervals T1 through T4. Thus, DTP1 through DTP4 equals 7.5 E and is constant in order to approximately obtain the reception levels RH1 through RH4 of FIG. 4. The infeed time intervals T1 through T4 are also expediently selected of approximately the same length, i.e. T1=T2=T3=T4, for core diameters of approximately the same size in the light waveguides LW1 through LW4, which core diameters are approximately present in both the ribbon conductors BL1 and BL2.

Respectively, individual transmission radiation fields SF1 through SF4 having respectively identical transmission levels DTP1 through DTP4 (equals 7.5 E) at the infeed times t1 through t4 are thus allocated to the light waveguides LW1 through LW4 during the illumination or infeed time intervals T1 through T4. The light spot LF of the transmission radiation field SF is controlled by the chronological or by the corresponding topical position (see FIG. 4) of the reception radiation fields RF1 through RF4 measured at the reception side. The same chronological distribution RP of the reception radiation fields RF1 through RF4 as shown in FIG. 4 for the case of a steadily migrating, continuously emitting light spot LF thus occurs at the reception side. The pulsed mode can also be advantageously realized in that the deflection mirror BS (FIG. 2) is discontinuously turned step-by-step, so that only the infeed locations identified with the infeed times t1 through t4 are scanned with the light spot LF.

2. FIG. 6 shows a further transmission level TP in the time interval tE–tA controlled with the assistance of the drive means ASV1. Using the chronological distribution RP of the reception level of FIG. 4, the central processor unit CPU respectively determines the light powers thereof. For example, the respective reception value of the maximums RM1 through RM4 can serve as a measure for the light power. The area under the selective reception levels RH1 through RH4 can also potentially be respectively utilized for determining the light power. The drive means ASV1 controls the intensity or the transmission power of the light spot LF at the transmission side with these light powers so that reception levels of approximately the same height, for example with maximums at approximately 8 E, are achieved at the reception side of the light waveguides LW1 through LW4. From, for example, the maximums RM1 through RM4 of different heights, the central processor unit CPU thereby individually calculates that transmission power in allocated time intervals TF1 through TF4 of FIG. 6 for each fiber or for each light waveguide that is required for the appertaining, desired reception maximums of, for example, 8 E on the reception light power scale of FIG. 4. The centers of the time intervals TF1 through TF4 shown as being contiguous thereby respectively, approximately correspond to the positions wherein light is coupled into the cores of the light waveguides LW1 through LW4. Instead of a steady scan motion, the light spot LF can be operated in a pulsed mode analogous to FIG. 5. The rectangles of FIG. 6 then have the same amplitude but with respective chronological durations of only from T1 through T4.

For controlling the transmission level TP of FIG. 6, the drive means ASV1 receives the command from the central processor unit CPU via the control line SL3 to drive the transmission element TE so that the light spot LF moved across the coupling region KB1 with beams with an illumination field strength of approximately 11 E during the infeed time interval TF1 beginning with the starting time tA, for example beginning with the infeed at the light waveguide LW1. At the reception side, this produces a reception level OH1 (see FIG. 8) for the light waveguide LW1 having a maximum OM1 barely below the described reception level of 8 E. In the time interval TF2, the central processor unit CPU instructs the drive means ASV1 to operate the transmission element TE with the lower transmission level of TP=9 E. A reception level OH2 having a desired maximum OM2 of approximately 8 E is then registered at the reception side for the appertaining reception radiation field RF2 (see FIG. 8). When the central processor unit CPU finds the reception level RH3 for the reception radiation field RF3 having the lowest maximum RM3=2 E in the group while searching the chronological distribution RP, then the transmission side is instructed by the feedback of the reception side to supply the light spot LF with a higher light power of approximately 13 E in the time interval TF3. In the time interval TF4, finally, the transmission level TP at the transmission side is lowered to approximately 7.5 E. Due to the step-like control of the transmission level TP, reception levels OH1 through OH4 having maximums OM1 through OM4, as shown in FIG. 8, which approximately result at the reception side for all four reception radiation fields RF1 through RF4. The switching of the transmission level TP to the different transmission stages or power levels thereby ensues approximately in the middle between two neighboring light waveguides, for example at times $$\frac{tM1+tM2}{2}, \frac{tM2+tM3}{2}, \frac{tM3+tM4}{2}.$$

The transmission level TP is thus corrected or controlled so that with the light power RH1 through RH4 of the reception radiation fields RF1 through RF4, the light powers for the reception radiation fields RF1 through RF4, which are desired or prescribed, can be approximately measured at the reception side. The operating power of the transmission side is thus controlled by the reception side with a type of "feedback loop". What is thus achieved is that the coupling conditions in the measuring instrument ME of the invention become independent of external influencing factors for subsequent measurements to a certain extent, for example, independent of different color applications (for example, red, green, yellow, blue) on the light waveguides LW1 through LW4 to be measured. When the transmission power is individually set and optimized so that for every light waveguide the reception levels that are of approximately the same height and are at approximately 8 E occur at the reception side, then, in particular, the signal-to-noise behavior of light waveguides having unfavorable coupling conditions can thereby be substantially improved. For example, the light power of the reception radiation field SF3 for the light waveguide combination LW3/LW3* is thus approximately matched to the level of the least attenuated radiation field SF4. Moreover, a faster or more exact measurement is obtained. Since the individual light waveguides are usually charged with highly different coupling factors and due to the setting of reception levels to identical heights, a complicated switching of amplifier stages in the optical receiver OR1 that is otherwise necessary is eliminated. The transmission level TP can be advantageously set so that a light power as required at the respective light waveguide for an optimum evaluation in the optical receiver OR1 and in the following evaluation means (for example, SUH)is just available.

3. The two actuating variables that have been presented according to 1) and, respectively, 2) can be utilized independently of one another and can also be particularly advantageously utilized in combination for controlling the light spot LF. The chronological position (corresponds to the topical position) of the reception radiation fields RF1 through RF4 as well as their appertaining light powers characterized, for example, by the maximums RM1 through RM4 (see FIG. 4) are determined by the central processor unit CPU from the chronological distribution RP of the reception radiation fields RF1 through RF4 relative to one another.

As shown in FIG. 7, the transmission level TP is controlled so that the light spot LF is respectively only activated at the location of the light-guiding light waveguide core, i.e. only in accord with the sequence of light-guiding infeed time intervals of the reception side acquired from the reference measurement of FIG. 4 which are t1 through t1+T, t2 through t2+T, t3 through t3+T, t4 through t4+T.

The light spot LF illuminates the infeed sections TC1 through TC4 of the light waveguides LW1 through LW4 at the transmission side only during these specific infeed time intervals, whereas it is deactivated in the other times it is moving. At the infeed times t1, t2, t3 and t4, the light spot LF is varied with respect to its light power or illumination field strength on the basis of the light powers RM1 through RM4 (see FIG. 4) acquired in the reference measurements so that reception levels OH1 through OH4 as in FIG. 8 are obtained. The light spot LF1 (or the transmission radiation field SF1 allocated thereto) allocated to the light waveguide LW1 is therefore approximately assigned a maximum transmission power DM1=11 E in order to approximately receive a maximum reception power OM1 of 8 E at the reception side. The light spots LF2 through LF4 (or their appertaining transmission radiation fields SF2 through SF4) individually allocated to the remaining three light waveguides LW2 through LW4 are set in roughly the following way with respect to their maximum transmission powers DM2 through DM4:

TM2=9 E;
TM3=13 E; and
TM4=7.5 E.

The chronological or topical distribution of the overall transmission level TP thus comprises selective transmission levels DH1 through DH4 during the movement of the light spot LF in the time interval tE–tA, and these selective transmission levels have been inversely supplemented in a certain sense relative to the reception levels RH1 through RH4 of FIG. 4 in order to obtain the desired reception levels of OH1 through OH4 of FIG. 8 that are of approximately the same size. The resulting maximums OM1 through OM4 of these reception levels OH1 through OH4 differ only slightly from one another, mainly due to the measuring errors in the reference measurement, for example the reception levels OH1 through OH4 are affected with a slight initial error occurring from the reference measurement.

Given the transmitter control of FIG. 7, thus, an amplitude modulation and, additionally, a pulse frequency modulation of the transmission pulses TH1 through TH4 are implemented.

This allows, first, a better exploitation of the light power of the transmission element TE. Due to the pulsed mode, far, far higher light powers can be coupled into the cores of the light waveguides, since thermal effects, which will occur, for example, given light-emitting diodes or semiconductor lasers, are reduced. Particularly when reception levels of approximately identical height are set, an improved signal-to-noise ratio can thereby be achieved at the reception side. This advantageously enables a faster or a more exact measurement of the test signals I1 through In in the light waveguides LW1 through LWn, since a time-consuming switching of amplifier stages otherwise necessary in the optical receiver OR1 is eliminated. This leads to a cost-savings at the transmission side as well as the reception side, since standard light-emitting diodes (LEDs) of medium light power can be utilized at the transmission side and light-sensitive elements without following, complicated amplifier stages can be utilized at the reception side. Second, the individual power control at the transmission side for each light waveguide LW1 through LWn respectively makes exactly that light power available that is required at the respective light waveguide for an optimum evaluation in the optical receiver OR1. This could otherwise only be achieved by a complicated switching of amplifier stages in the receiver OR1, and this would involve technical problems, for example different offset voltages. On average, thus, a lower overall light power will suffice for operating the measuring instrument of the invention, so that problems of eye safety can be countered, particularly given employment of a laser as transmission element. Given the application of the invention portable, battery-operated devices, the energy savings are also additionally of consequence, these being provided by the considerably reduced, average power consumption of the transmission element. A smaller, lighter and more cost-beneficial battery can thus be employed as the power supply.

For example, the alignment procedure for the two ribbon conductors BL1 and BL2 in the multiple splicing means MS1 (see FIG. 1) can be carried out with the reception levels OH1 through OH4 indicated in FIG. 8. Two adjustment elements SG1 and SG2 are provided in the multiple splicing means MS1 for displacing the two ribbon conductors BL1 and BL2 relative to one another. These adjustment elements SG1 and SG2 can be actuated or moved relative to one another with control signals SS1 or SS2 proceeding from the central processor unit CPU via control lines SL1 or SL2, respectively. On the basis of the data sets DS3 arriving in the measured value memory MEM in chronological succession, the central processor unit CPU can advantageously draw conclusions from the mvoement of the adjustment elements SG1 and SG2 regarding the dependency of the transmission loss at the transition between the ribbon conductors BL1 and BL2 in the multiple splicing means MS1. Since this dependency is individually measured for each fiber, it can be advantageously employed for the optimum alignment of the fibers. In addition, the measured values can be expediently employed for the control of the splicing procedure as well as for identifying the splice attenuation that has been achieved.

According to the comments directed to FIGS. 1 through 8, the method of the invention can be particularly utilized for optimizing the individual, selective infeed power for each light waveguide to be measured, particularly in a light waveguide ribbon. This is achieved in that an arbitrary transmission level is respectively coupled into the light waveguides to be measured in at least one reference measurement or in a type of calibration procedure, and the characteristic, chronological distribution of the appertaining reception radiation fields is registered and retained at the reception side. Various criteria for controlling the infeed light spot such as, for example, its illumination field strength, its size and shape, its turn-on and/or its turn-off times, etc., can be determined from this chronological distribution. The coupling conditions for each light waveguide to be measured can be individually influenced to a certain extent by this type of "feedback" to the transmission side from the reception side, so that specific reception levels can be prescribed and can also be approximately observed. It can also be advantageous to largely eliminate initial errors from the reference measurement by iteration, for example, by averaging a plurality of reference measurements.

The control of the light spot LF can also be augmented to form a control loop whose manipulated variables are determined and offered from the chronological distribution in a way analogous to FIGS. 1 through 8. The drive means for the transmission/coupling means SK then expediently comprises a control circuit with internal feedback.

Over and above this, the method of the invention or the appertaining measuring instrument of the invention can also be utilized for solving a number of additional problems of single-fiber and of multi-fiber technology. Thus, for example, the measuring instrument ME in FIG. 1 can also be a component part of a manufacturing line for light waveguide ribbons and can be utilized for fabrication control or fabrication monitoring of the light waveguide ribbons. Coming from the left, the light waveguides LW1 through LWn are drawn off toward the right through the measuring instrument ME and thereby additionally pass through an extruder preceding the transmission/coupling means SK. This extruder first surrounds the light waveguides LW1 through LWn guided approximately parallel side-by-side with an outer envelope AH1 as indicated for illustration in the left-hand part of FIG. 1. The light waveguide ribbon BL1 manufactured in this way then runs through the transmission/coupling means SK in the coupling device KV1 and over the cylindrical bending arbor ZT1 of the flex coupler BK1 that, for example, is fashioned as a movable roller. When passing through the coupling means KV1, the optical transmitter OT1 couples a test light LB (continuously or in defined time intervals)in a chronological succession into the light waveguides LW1 through LWn to be measured according to FIGS. 1 and 2. After traversing a prescribable testing distance (the multiple splice means MS1 of FIG. 1 is to be omitted) of the light waveguide ribbon BL1, light parts are taken with the optical receiver OR1 of FIG. 1 from the test light or test signals I1 through In and are supplied to evaluation means AE1. To that end and analogous to the transmission side, the light waveguide ribbon BL1 is likewise drawn over a cylinder ZT2 fashioned, for example, as a movable roller in the flex coupler BK2, so that the chronological distribution RP of the outfed reception radiation fields RF1 through RFn is acquired with the light-sensitive element GLE of the optical receiver OR1 and can be registered or deposited in the measured value memory MEM of the evaluation means AE1. Additionally, the chronological distribution RP is visually displayed in the display means DSP1 of the evaluation means AE1. The chronological distribution RP is offered for evaluation in this way. Statements as well as information about various conditions of the light waveguides LW1 through LWn in the light waveguide ribbon BL1 can now be acquired from the retained, chronological distribution RP of the reception radiation fields RF1 through RFn:

1. For example, the topical or spatial position of the light waveguides LW1 through LWn, with n=4, in the light waveguide ribbon BL1 can be determined from the chronological distribution RP. The reception levels RH1 through RH4 are individually allocated to the light waveguides LW1 through LW4 in the light waveguide ribbon BL1 in an unambiguous way. Their maximums RM1 through RM4 each respectively identify the locations of maximum light guidance in the light waveguides LW1 through LWn, with n=4, i.e. their core positions. It thus occurs from a review or a snapshot of the display means DSP1 of FIG. 1 that the light waveguide LW3 lies somewhat offset toward the left toward the light waveguide LW2 in the outer envelope AH1, so that the light wave guides LW1 through LWn, with n=4, are not equidistantly embedded in the outer envelope AH1. The central processor unit CPU identifies this deviating condition for the light waveguide LW3 and, in response thereto, instructs the control means ASV1 via the control line SL3 to correspondingly correct the extrusion process in the extruder via a separately provided control line that is not shown in FIG. 1. It is thus possible to manufacture a light waveguide ribbon in whose outer envelope the light waveguides can be exactly introduced in prescribable positions. At the same time, the topical or spatial distribution of the light waveguide cores can be precisely indicated, and this, for example, plays a part in quality assurance measures and also simplifies the manipulation with the light waveguide ribbons, particularly during splicing procedures.

2. In order to determine if the light waveguides LW1 through LWn, with n=4, are surrounded with a uniformly thick outside sheath AH1 by the extrusion process, the maximums RMI through RM4 of the measured reception levels RH1 through RH4 of FIG. 4 are analyzed. It can be concluded from the reception levels RH1 through RH4 of different heights in the snapshot or screen of the display means DSP1 that the light waveguide ribbon thickness is different or fluctuates transversely relative to the longitudinal axis of the light waveguides LW1 through LWn, with n =4. The reception radiation field RF3, which is allocated to the light waveguide LW3, has the lowest reception level RH3 in the display. It can be concluded therefrom that the light waveguide LW3 experiences the greatest attenuation at the transmission side. This indicates a thicker coating at the location of the light waveguide LW3. For monitoring and controlling the coating process, the central processor unit CPU identifies the power levels, for example, the maximums RM1 through RM4, from the chronological distribution RP. The central processor unit CPU thereby controls the coating process with the drive means ASV1 so that the power levels RH1 through RH4 lie at approximately the same height, for example within a prescribable tolerance range. In this way, the light waveguides LW1 through LWn are embedded by a uniformly thick outside sheath AH1 transversely relative to their longitudinal axis even if the light waveguide were to have diameters that are different from one another. Over and above this, the power maximums RM1 through RM4 can be recorded and registered for evaluating the quality of the manufacturing process for the respectively manufactured light waveguide ribbon.

3. When the light waveguides LW1 through LWn, with n=4, stem from different manufacturing lots, for example they have different fiber geometries and fiber properties, then these can be exactly documented with the chronological distribution RP and can be utilized for the manufacture of the light waveguide ribbon BL1 as well as for following manufacturing steps or further applications. In particular, the chronological distribution RP identifies and represents the individual condition of the light waveguides LW1 through LWn in the ribbon conductor BL1 or the condition of a group of individual light waveguides LW1 through LW4 lying loosely side-by-side. Reference quantities as well as reference values for subsequent measuring jobs with the light waveguide ribbon BL1 or the group of light waveguides can therefore be advantageously acquired from the chronological distribution RP.

Over and above this, the method of the invention can also be utilized, for example, in a coloring line as well as in other coating processes for light waveguides. The coating process for every individual light waveguide can thereby be registered, evaluated and controlled individually on the basis of the test information from the chronological distribution.

In addition, the method of the invention also offers the possibility of automatically recognizing the plurality of individual light waveguides LW1 through LWn illuminated at the transmission side from the chronological distribution RP of the reception radiation fields RF1 through RFn. For example, this can be of significance given light waveguide bundles having a greater plurality of more or less loose light waveguides. It is of particular advantage that the condition of each individual light waveguide or of each individual optical fiber can be unambiguously taken from the chronological distribution. For example, this plays a part given two groups having a plurality of light waveguides whose ends are at a great spatial distance from one another and whose light waveguides are to be respectively connected in an unambiguous way to corresponding light waveguide pairs. In addition, for example, an alignment of the two ribbon conductors BL1 and BL2 in FIG. 1 can be monitored and controlled with the measuring method of the invention. To that end, the two ribbon conductors BL1 and BL2 are expediently shifted back and forth relative to one another with a "jitter" motion, so that conclusions about the mutual position of corresponding light waveguides or light waveguide combinations such as, for example, LW1/LW1* can be acquired on the basis of the chronological variation of the reception levels in the chronological distribution RP.

In addition, the method of the invention can also advantageously supply information about light-guiding properties as well as fiber geometries of the light waveguides or optical fibers themselves. For example, the location of maximum light guidance in the allocated light waveguides, for example their core positions, can be respectively localized in an unambiguous way from the chronological distribution of the measured reception radiation fields. A great variety of transmission characteristics for the light waveguides such as, for example, phase running times, transmission losses, transmission attenuations, splice attenuations, eccentricities of the fiber core, etc., can be determined from the power levels in the chronological distribution.

Figure 9:
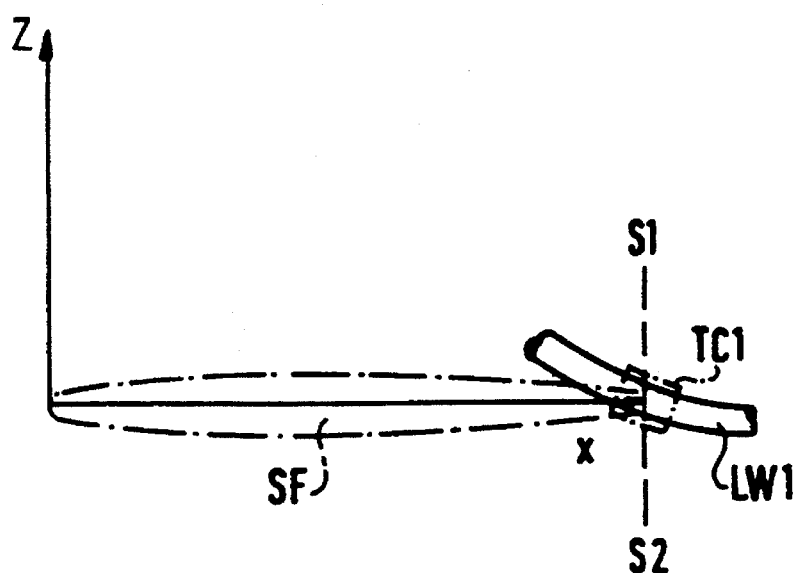
FIG. 9 is a schematic illustration of the plane at the transmission side infeed.
Figure 10:
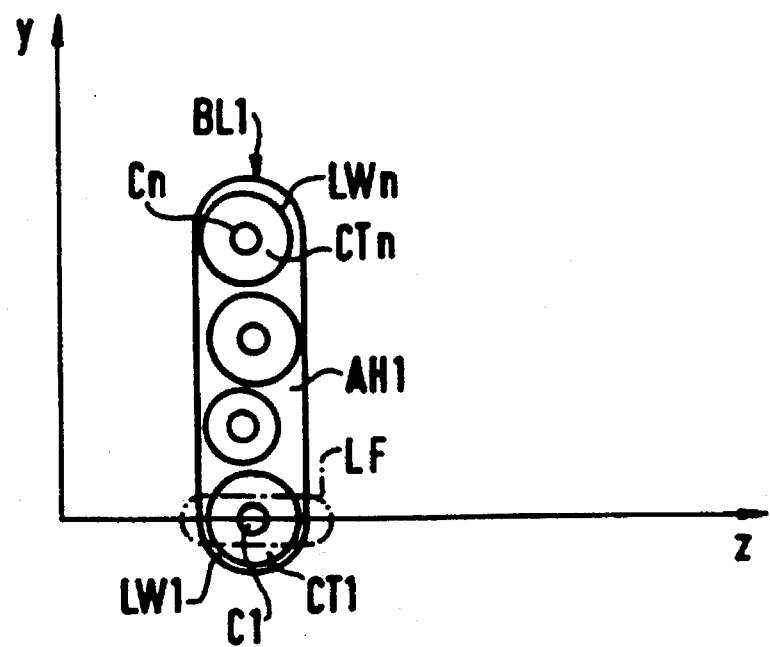
FIG. 10 is a schematic illustration of an infeed taken along a plane S1-S2 of FIG. 9.

FIGS. 9 and 10 illustrate the three-dimensional shape of the light spot LF. Analogous to FIG. 2, FIG. 9 defines a scan plane having the coordinate axes x and z. The x-axis identifies the beam direction or propagation direction of the transmission radiation field SF. The y-axis points in the scan or displacement direction of the transmission radiation field SF transversely relative to the longitudinal axis of the light waveguides LW1 through LWn to be measured in the coupling region KB1 and is perpendicular to the plane of FIG. 9. For illustration, FIG. 9 shows only one curved sub-section of the light waveguide LW1, whereas the rest of the light waveguides LW2 through LWn to be measured have been omitted. The transmission radiation field SF, which is schematically indicated in the plane of this drawing with dot-dash lines, has its light spot entering nearly tangentially into the core of the curved light waveguide LW1 at the infeed location in the region of the infeed section TC1 indicated with broken lines. The infeed section TC1 is thereby expediently illuminated by the light spot up to approximately 1 mm along the light waveguide LW1. As warranted, the light spot can also respectively directly illuminate the open end face of, for example, the light waveguide LW1, if this end face is accessible.

FIG. 10 shows a schematic view of the light spot together with the ribbon conductor BL1 in a plane or cross section that is taken along the section line S1, S2 of FIG. 9 at the infeed location of the transmission radiation field SF into the light waveguide LW1. For better illustration of the three-dimensional form or, respectively, shape of the light spot LF, FIG. 10 represents an imaginary infeed plane having the coordinate axes y and z, which both extend perpendicular to the propagation or beam direction x of the transmission radiation field SF. The light waveguides LW1 through LWn have diameters that are different from one another and are combined in the ribbon conductor BL1. The cores C1 through Cn of the light waveguides LW1 through LWn are thereby not exactly arranged along a straight line parallel to the scan direction y at the respective infeed location but lie somewhat offset relative to one another in different spatial positions in the outer envelope AH1 of the ribbon conductor BL1. The cores C1 through Cn also potential have non-equidistant spacings from one another along the scan direction y. The reason for the positioning of the cores deviating from the ideal distribution in z-direction and/or in y-direction can, for example, be that the cores C1 through Cn lie eccentrically, for example not centrally in their respective outer coating CT1 through CTn. For example, the core eccentricities lie on the order of magnitude of approximately 2 through 3 μm given monomode light waveguides. Particularly when combining the light waveguides LW1 through LWn of different thicknesses to form the ribbon BL1, fluctuations in the applied thickness of their common outside sheath AH1 can occur, so that the light waveguides LW1 through LWn assume different spatial positions therein, and preferably in z-direction. The light spots LF is then advantageously shaped with respect to its three-dimensional form so that it respectively illuminates only one of the cores C1 through Cn of the light waveguides LW1 through LWn during the movement of the transmission radiation field, so that a respective cross-over of light into neighboring light waveguides is largely avoided.

For example, an approximately thin oval or elliptical, approximately strip-shaped or line-shaped cross sectional form having alignment of its longitudinal axis in the z-direction is advantageously selected in FIG. 10 for the light spot LF in the infeed plane y, z at the infeed location of the light waveguide LW1. The light spot LF thus has a non-uniform cross sectional shape that has a privileged direction in the z-direction at the infeed location perpendicular to the propagation direction x. The spatial expanse of the spot LF in the z-direction, which is perpendicular relative to the propagation direction x, is advantageously selected greater than the expanse in the scan direction y. The transmission radiation field SF in FIG. 10 is aligned, for example, onto the core C1 of the light waveguide LW1, so that the appertaining light spot LF illuminates the core C1 approximately symmetrically relative to its center. The field SF has a spatial expanse in the z-direction that assures that the cores C1 through Cn are scanned and reliably illuminated in the z-direction by the light spot LF of the transmission radiation field SF migrating in the y-direction even given an arrangement of the cores in different z-spatial positions in the ribbon conductor BL1. The spatial expanse of the light spot LF in the z-direction at the infeed location is expediently selected so that the anticipated positional tolerances of the light waveguide cores C1 through Cn, which are also being particularly capable of occurring due to the employment of ribbons of different thicknesses in the flex coupler BK1, are thus compensated. In practice, one can count on ribbon tolerances that preferably achieve approximately ±50 μm overall. In this way, the light infeed can be advantageously made independent of fluctuations or tolerances of the light waveguide ribbon thickness (such as, for example, the non-uniformly thick or inhomogeneous application thickness of the outer envelope AH1), as well as from the fiber geometries of the light waveguides LW1 through LWn (such as, for example, the core eccentricities as well as different light waveguide diameters due to different manufacturing lots), of the radii of curvature of the light waveguides LW1 through LWn that deviate from one another, from the light spot imaging itself, etc. When a thin outside sheath AH1 is selected, for example an outside sheath AH1 that is not thickly applied onto the outer envelopes CT1 through CTn, the light spot LF expediently comprises a spatial expanse in the zodirection at the infeed location that corresponds at least to half the light waveguide ribbon thickness or approximately to half the outside diameter of the respective light waveguides, preferably between 100 μm and 200 μm. Given thick light waveguide ribbons or given light waveguides having larger outside diameters, the length of the light spot LF in the z-direction is expediently selected correspondingly larger. A generally sufficient expanse is an expanse of the light spot LF in the z-direction at the infeed location that is respectively on the order of magnitude of the thickness or the outside diameter of the respective light waveguide or the respective thickness of the light waveguide ribbon BL1. The longitudinal expanse of the light spot LF is thus expediently respectively matched in the z-direction so that a focused infeed into the cores C1 through Cn of the light waveguides LW1 through LWn with the light spot LF during the scan motion of the transmission radiation field SF is also largely assured when the cores C1 through Cn assume different spatial positions in the z-direction at the infeed location in the ribbon conductor BL1.

The transmission radiation field SF is guided, particularly by a beam deflection means such as, for example, the pivotable mirror BS of FIG. 2, laterally in the y-direction, for example transversely relative to the longitudinal extent or axial extent of the ribbon conductor BL1 or relative to the light waveguides LW1 through LWn, so that the beam is respectively deflected onto the curved light waveguides LW1 through LWn at the respective infeed location in the coupling region KB1 (see FIG. 2) in the chronological succession. The movement of the transmission radiation field SF can be advantageously implemented in various ways:

A1) The transmission radiation field SF is steadily displaced, i.e. continuously, particularly linearly across the coupling region KB1 (see FIG. 2), so that the coupling region KB1 and, thus, the infeed locations of the light waveguides LW1 through LWn are continuously swept.

A2) The transmission radiation field SF is brought into infeed positions step-by-step or rastered, for example in scan steps of, respectively, discontinuities, and these infeed positions being respectively allocated to the light waveguides to be measured. When aligned to the respective infeed locations of the light waveguide cores C1 through CN, the field SF is stationary and not moving.

The transmission radiation field SF can be advantageously differently activated or switched independently of the type of motion of the radiation field:

B1) The transmission radiation field SF is continuously emitted, so that a continuously luminous light spot LF is formed in the infeed plane y, z during the motion of the radiation field.

B2) The transmission radiation field SF is turned on and off, for example keyed, in a prescribable sequence or is operated with on times and dead times in a pulse-like fashion, so that a pulsed or keyed light spot LF is formed in the infeed plane y, z for prescribable infeed positions of the transmission radiation field SF, which positions are particularly formed in the region of the infeed locations of the curved light waveguide LW1 through LWn. For example, a keying of the transmission level TP or curve of the intensity distribution of the transmission radiation field SF can occur according to FIGS. 5, 6 or 7.

In all four operating modes A1, A2, B1, B2, the light spot LF advantageously has a beam or illumination field width LFB in the scan direction y such that allocated test signals I1 through In (see FIG. 1)in the light waveguides LW1 through LWn to be measured are selectively activated during the translational, lateral movement of the transmission radiation field SF and a crossover of light into neighboring light waveguides is thereby optimally avoided. To that end, the beam width LFB of the light spot LF in the scan direction y is advantageously respectively selected smaller than the distance KB between two neighboring light waveguide cores (for example, C1, C2). Taking the tolerances of the fiber geometries, particularly the respective core eccentricities (for example, KE1, KE2), of two neighboring light waveguides (for example, LW1, LW2)into consideration, $$OG=KB-(KR1+KR2)-(KE1+KE2) \geq LFB$$

wherein OG is an upper limit for the beam width LFB, and wherein KR1 and KR2 are core radii. Given monomode light waveguides in a densely packed light waveguide ribbon, wherein KB=250 μm, KR1≈KR2≈10 μm, KE1≈KE2≈2.5 μm approximately occur, then OG≈225 μm. What is advantageously assured in this way is that the reception radiation fields RF1 through RFn registered at the reception side are present largely selectively, for example separated from one another, so that a selective, individual evaluation of the chronological distribution RP of the reception radiation fields RF1 through RFn becomes possible.

The beam width or spatial expanse LFB of the light spot LF in the scan direction y can be expediently set in the following way at the respective infeed location for the light waveguides to be measured, taking the respective light waveguide core diameter KD into consideration:

a) LFB≈KD b) LFB>KD c) LFB<KD.

Dependent on the respective operating mode of the transmission radiation field SF or combinations of the operating modes A1, A2, B1, B2, the beam width LFB is advantageously adapted according to a), b) or c), taking the upper limit OG into consideration:

I. The transmission radiation field SF is operated according to A2) and B2), i.e. the transmission radiation field SF is moved step-by-step into its local infeed positions for the infeed locations of the curved light waveauides LW1 throuah LWn and is aligned thereat to the cores C1 through Cn of the light waveguides LW1 through LWn. While the transmission radiation field SF is stationary and aligned, it is activated for a prescribable time span or infeed time interval (for example, T1 in FIG. 5). In order to be able to assure a reliable light infeed in this case of a light spot LF that is respectively stationary at the infeed location, the beam width LFB for the light spot LF is expediently selected according to a) or b).

Given a selected beam width according to c), an exactly targeted impingement of the respective core would be made more difficult under certain circumstances due to the slight expanse of the light spot LF in the scan direction y and taking the established tolerances of the motion process into consideration. In case a), i.e. LFB≈KD, a far less exact alignment is required in comparison to case c)in order to impinge the respective light waveguide core, and to bring the light spot LF and the respective core into approximate coincidence. Case b) with LFB>KD is especially advantageous since, even given an inexact alignment of the transmission radiation field SF onto the respective core in the y-direction, this core can be completely illuminated by the light spot LF. In that a lower limit UG for the beam width LFB is expediently selected at least equal to the core diameter KD plus the sum of all the y-tolerances of the respective light waveguide, the light infeed in the scan direction y can also be made independent of tolerances and fluctuations during the scan procedure such as, for example, core eccentricities, non-equidistantly arranged light waveguides in the y-direction, imprecise guidance and alignment of the transmission radiation field SF, etc. Thus valid for the beam width LFB is: OG>LFB>UG.

II. The transmission radiation field SF is operated according to A2) and B1), for example the transmission radiation field SF skips "point-like" from infeed position to infeed position of the light waveguides LW1 through LWn and is stationary thereat for a prescribable infeed time interval. The transmission radiation field SF remains constantly activated during this scan motion across the entire coupling region KB1. The beam width LFB is then expediently selected corresponding to (I).

III. The transmission radiation field SF is operated according to A1) and B1), for example the curved light waveguides LW1 through LWn are continuously swept by the transmission radiation field SF, whereby the light spot LF burns continuously or uninterrupted. For a reliable light infeed, the beam width LFB of the light spot LF can be expediently selected according to c), for example the light spot LF is especially advantageously optimally imaged line-shaped in the infeed plane y, z. The beam width LFB is thus selected smaller than the respective core diameter KD, so that LFB<KB is valid. As a result thereof, light can be optimally coupled into the respective core and can be coupled focused into the respective light waveguide or the core thereof with an especially high chronological resolution (FIG. 4). In that the line-shaped light spot LF migrates or moves continuously over the core of the respective light waveguide at the infeed location, it is reliably assured that the respective core is impinged regardless of tolerances and fluctuations in scan direction y. Thus, $$UT = \frac{KD}{LFV}$$

wherein UT is the sweep time, LFV is the speed which is required by the light spot LF for sweeping the respective infeed location, particularly the light waveguide core diameter KD. Given a scan frequency of 20 Hz for the entire coupling region KB1 having four optical fibers combined to form a ribbon conductor, a sweep time of UT=500 μsec thus approximately occurs for the respective light waveguide core. Leaving the response time of the optical receiver OR1 and/or of the evaluation means AE1 out of consideration, an approximately square-wave pulse having the approximation duration UT occurs at the reception side for the respective light waveguide.

IV. The transmission radiation field SF is operated according to A1) and B2), for example the transmission radiation field SF is continuously moved over the coupling region KB1, whereby it is switched on and off, i.e. keyed in a prescribable sequence. For example, the beam can be pulsed according to one of the sequences illustrated in FIGS. 5–7. The transmission radiation field SF is thus not arrested but is continuously moved forward in the respective coupling positions, i.e. while the transmitter is activated for a period T1 through T4 in FIG. 5. Expediently, the transmission radiation field SF is activated before the respective infeed location is reached, so that the light spot LF can run over the respective light waveguide core and is in turn deactivated after it leaves the infeed location or the light waveguide core. The respective light waveguide core C1 through Cn is thereby advantageously scanned with a light spot LF corresponding to III whose spatial expanse LFB in the scan direction y can be selected smaller than the respective core diameter KD. LFB<KD and accordingly case c) is thus advantageously selected.

The infeed time intervals for a selective infeed of test signals in cases I or, respectively, II are largely defined by the response times of the elements in the optical receiver OR1 (for example, of the common light-sensitive element GLE) and/or in the evaluation means AE1 of the reception side (for example, the digitization element SUH).

Figure 11:
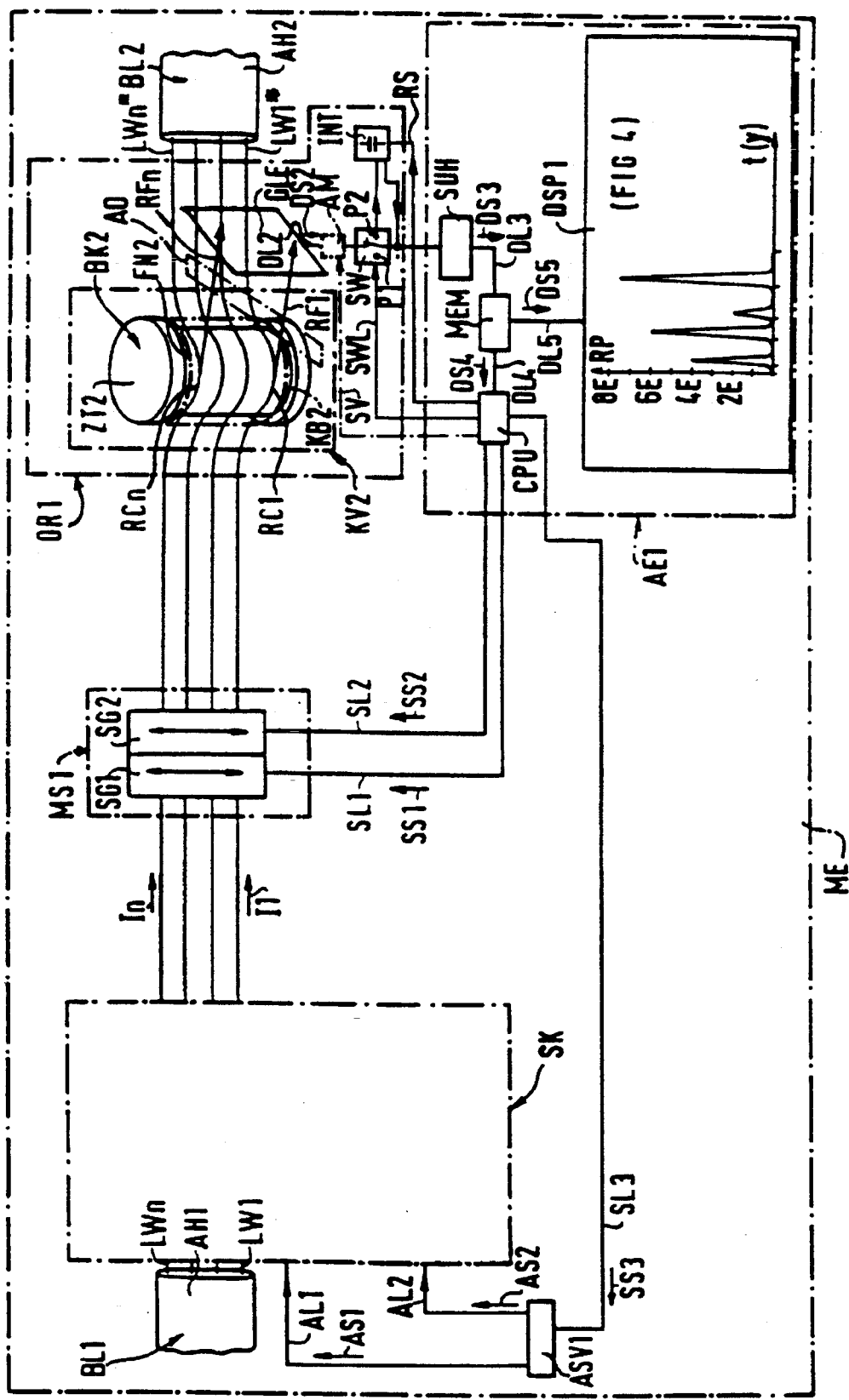
FIG. 11 is a schematic diagram of the structure of a modification of the measuring instrument of FIG. 1 for implementing the method of the present invention.

FIG. 11 shows the preferred embodiment of the measuring instrument ME of FIG. 1. of the invention. Elements from FIGS. 1 through 10 that have been incorporated respectively unmodified are respectively provided with the same reference characters in FIG. 11 (as well as in the following FIGS. 12 through 16). The optical transmitter as well as the coupling device have been omitted in the dot-dash framing of the transmission/coupling device SK for the sake of clarity. These components together with the multiple splicing means MS1 formed by dot-dash lines can be expediently combined to form a portable test unit, for example of a light waveguide splicing device or of an attenuation measuring device. In addition to being utilized in this especially advantageous field of application, the invention can also be utilized for the selective identification of additional optical transmission characteristics such as, for example, of phase running times, pulse responses, line attenuations, etc., and can also be utilized in a plurality of additional problem areas of multi-fiber technique such as, for example, for identifying light waveguides, for controlling manufacture and for monitoring manufacture of light waveguide ribbons, for quality control, for identifying fiber geometries and optical quality properties, etc. The transmission or splice attenuation measurement in light waveguide splicing devices shall be respectively referenced for the following comments.

In FIG. 11, the first ribbon conductor BL1 (light waveguide ribbon) having the light waveguides LW1 through LWn and the second ribbon conductor BL2 having the light waveguides LW1* through LWn*, which are to be welded together, reside opposite one anther in the multiple splicing means MS1. The light waveguides LW1 through LWn of the ribbon conductor BL1 are embedded nearly parallel in a flat, outer envelope AH1 (of plastic material) having an approximately rectangular cross section that is indicated in the left-hand part of FIG. 11 and has been omitted in the rest of the figure for the sake of clarity. Corresponding thereto, the light waveguides LW1* through LWn* of the ribbon conductor BL2 are surrounded by a similar fashioned, outer envelope AH2 that is suggested in the right-hand part of FIG. 11 and has then been omitted. An at least partially optically transparent material is expediently selected for the outer envelopes AH1 and AH2 in order to assure a largely low-attenuation infeed and/or outfeed of light.

In order to couple light of a transmission radiation field into the light waveguides LW1 through LWn to be measured in chronological succession at the transmission side, the transmission/coupling means SK expediently comprises, for example, a coupling device according to the flex coupler principle. For light infeed, the light waveguides LW1 through LWn are thereby respectively advantageously guided approximately arcuately or, respectively, curved around an approximately cylindrical bending arbor of a flex coupler along an arbitrarily prescribable path section. The coupling device having the flex coupler has been omitted in the transmission/coupling means SK of FIG. 11 bounded with dot-dash lines for the sake of clarity. (An exemplary embodiment of the transmission/coupling device SK is shown in FIG. 2.) A light infeed of the transmission side into the open end faces of the light waveguides to be measured is also expedient given free accessibility to their ends.

The optical transmitter of the transmission/coupling device SK, for example, expediently comprises at least one transmitter element, for example a laser diode or a laser. This transmission element emits a transmission radiation field in the direction toward a beam deflection means such as, for example, a rotatable mirror. This rotatable mirror is advantageously turned or, respectively, tilted transversely relative to the main propagation direction of the transmission radiation field with a galvanometer scanner. As a result thereof, the transmission radiation field has its light spot moved in a chronological succession across the infeed sections of the light waveguides to be measured, so that test signals I1 through In are coupled in chronological succession into the light waveguides LW1 through LWn to be measured.

In FIG. 11, the infed test signals I1 through In run in the light waveguides LW1 through LWn to be measured via the multiple splicing means MS1 to the reception side. At the latter, part of the signals are outfed in a second coupling device KV2 (constructed analogous to the coupling device of the transmission side) of the optical receiver OR1, being coupled out in approximately tangential direction with, for example, a second flex coupler BK2. The light waveguides LW1* through LWn* of the second ribbon conductor BL2 are placed in a curved path around a cylinder ZT2 (analogous to the transmission side) in a guide groove FN2 for this purpose. As a result thereof, reception radiation fields RF1 through RFn, which are allocated to the transmission radiation fields SF1 through SFn and also individually allocated to the light waveguides LW1 through LWn to be measured, emerge from their cores along preferable arcuate outfeed sections RC1 through RCn in the coupling region KB2 of the flex coupler BK2. Since the test signals I1 through In are selectively produced in a chronological succession in the cores of the light waveguides LW1 through LWn due to the displacement motion of the light spot of the transmission side across the infeed sections of the light waveguides LW1 through LWn, the reception radiation fields RF1 through RFn allocated thereto also appear in a corresponding chronological succession.

Thus, the reception radiation field RF1 for the light waveguide LW1 is received first. Following in succession are the reception radiation fields RF2 through RFn-1 until, finally, the reception radiation field RFn allocated to the light waveguide LWn arrives last in the coupling region and emerges therefrom. The reception radiation fields RF1 through RFn are at least partially acquired or registered in the chronological succession, for example sequentially by a common, preferably stationarily arranged, light-sensitive element GLE and are respectively convened by the latter into an electrical test signal DS2.

Given a digital signal evaluation, the test signal DS2 is transmitted directly via a signal line DL2 to a digitization element SUH of an evaluation means AE1. This digitization element SUH samples the electrical test signals DS2 arriving in chronological succession in short time intervals, digitizes these samples and transmits digitized test signals DS3 via a line DL3 to a measured value memory MEM of the evaluation means AE1. From this measured value memory MEM, the registered, digitized test data are forwarded as a signal DS5 via a line DL5 to a display means DSP1, for example a display, and are visually presented thereat. A central processor unit CPU respectively takes the registered, chronological distribution of the reception radiation fields RF1–RFn as signal DS4 from the measured value memory MEM via a line DL4 and evaluates the test information.

Given employment of a large-area reception element GLE such as, for example, a photodiode that covers all light waveguides to be measured, it is not required at the reception side to displace, for example, the reception element GLE for a selective, discriminatable pick-up of the reception radiation fields RF1 through RFn corresponding to the chronologically successively activated light waveguides LW1 through LWn. An individual alignment of the reception element GLE to the respectively activated light waveguide as in the case of a small-area reception element that covers respectively only one light waveguide is thus eliminated. Under certain circumstances, it can also be advantageous for a farther-reaching topical or spatial resolution of the reception radiation fields RF1 through RFn to attach a plurality of reception elements, preferably stationary, particularly in line or array form, instead of the common reception element GLE. For example, traditional photodiodes, CCD elements, diode arrays, diode lines, etc., are suitable as reception elements.

For determining and evaluating the coupling conditions in the measuring instrument or means ME, at least one chronological position distribution of the light waveguides LW1* through LW11* to be measured is first implemented at the reception side given at least one first scan of the transmission radiation field at the transmission side. In order to register the chronological distribution of the reception radiation fields RF1 through RFn of the light waveguide combinations LW1/LW1* through LW11/LW11* during this first scan of the transmission side at the reception side, a switch SW in the optical receiver OR1 in the line DL2 is brought into such a switch position that the reception signal DS2 of the successively arriving reception radiation fields RF1 through RFn respectively are directly connected to the evaluation means AE1.

The chronological distribution RP of the reception radiation fields RF1 through RFn, with n=4, is entered in the display means DSP1 of the evaluation means AE1 of FIG. 11 and will appear as shown in FIG. 14. Given a scan of the transmission radiation field at the transmission side during the duration tE–tA beginning at the light waveguide LW1 and ending at the light waveguide LWn, with n=4, selective, distinguishable reception levels RH1 through RH4 each of which is individually and unambiguously allocated to the light waveguides LW1 through LW4 appear in chronological succession in the display means DSP1 during the duration tE–tA. Given a nearly linear displacement motion of the light spot at the transmission side, the chronological distribution RP of the reception radiation fields RF1 through RFn measured over the time t approximately corresponds to the topical position of the light waveguides, particularly of the light waveguide cores. Given digital signal evaluation, the selective reception levels RH1 through RH4 each respectively represent envelopes or interpolations for the digitized, sampled test signals, i.e. they correspond to the chronological distribution of the reception radiation fields RF1 through RF4 for the case of a continuous or steady infeed at the transmission side. For example, the reception level RH1 allocated to the light waveguide LW1 encloses or envelopes three discrete reception values DP1, DP2 and DP3 that are entered with broken lines. Corresponding to the total of four light waveguides LW1 through LW4 of conductor BL1 or waveguides LW1* through LW4* provided in the ribbon conductors BL2, the four envelopes RH1 through RH4, which may be potentially different, each having respectively three discrete reception values. Their maximums are referenced RM1 through RM4 and are assigned times tM1 through tM4.

The four envelopes or reception levels RH1 through RH4 differ in terms of their chronological position (time slot), i.e. in terms of their chronological position relative to one another. Light is thus not coupled into the cores of the light waveguides LW1 through LW4 to be measured at all times tin the time interval tE–tA during the first scan of the transmission radiation field at the transmission side but is only coupled in at the times the light spot in the transmission/coupling means (transmission coupler) SK impinges on a fiber or light waveguide core. Light power is thus only guided in the light waveguide cores at defined infeed durations as well as at defined time intervals.

For calculating the infeed times of the transmission radiation field at the transmission side, the time slots of the reception radiation fields RF1 through RF4 or of the appertaining reception levels RH1 through RH4 are therefore identified at the reception side during at least one first scan of the transmission side. To that end, the respective time of the leading level edge and/or the time of the trailing level edge for the respective reception level is identified with the assistance of the central processor unit CPU of the evaluation means AE1 and is retained. As a result of these two times of every reception level RH1 through RH4, the time slot for each level is determined in an unambiguous way. As shown in FIG. 14, the times t1, t2, t3 and t4 of leading level edges thus identify those infeed times beginning with which light is actually supplied into the cores of the light waveguides LW1 through LW4. The times t1*, t2*, t3* and t4*, by contrast, determine those beginning times during which no light is guided in the cores of the light waveguides LW1 through LW4 and, thus, the beginning of dead times. The time slots t1 through t1*, t2 through t2*, t3 through t3* and t4 through t4* of the reception levels RH1 through RH4 thus identify the chronological sequence as well as the duration of the actual light guidance in the light waveguide combinations LW1/LW1* through LW4/LW4* to be measured. A defined time frame having transmission times (namely between the times t1 through t1*, t2 through t2*, t3 through t3* and t4 through t4*) as well as transmission pauses or "dead times", which are the time intervals between the times tA through t1, t1* through t2, t2* through t3, t3* through t4 and t4* through tE, are thereby unambiguously established for the infeed at the transmission side of subsequent, actual measurements.

In FIG. 11, the central processor unit CPU of the evaluation mans AE1 of the reception side communicates this time frame, which is the times (t1/t1* through t4/t4*) of the reception levels RH1 through RH4 acquired from the first scan of the transmission side, to the drive means ASV1 of the transmission/coupling means SK at the transmission side with control signals SS3 via the line SL3. The drive means ASV1 converts these control signals SS3 into control signals AS1 and, preferably, controls the transmission element of the optical transmitter with these via a line AL1 in accord with the prescribed time frame, preferably in a type of "pulsed mode". The transmission element is thus respectively activated at times t1, t2, t3 and t4 according to the prescribed time frame and is respectively deactivated at the times t1*, t2*, t3* and t4*.

The pulsed mode can also be advantageously realized in that the beam deflection means of the transmission/coupling means SK, for example a deflecting mirror, is turned discontinuously or in a step-by-step manner with a galvanometer scanner as a drive element, so that the light waveguide cores are only keyed or swept with the light spot of the transmission radiation field during the transmission times t1 through t1*, t2 through t2*, t3 through t3* and t4 through t4*.

To that end, an element having controllable motion such as, for example, a stepping motor or a motor with an answerback is especially expedient as the drive element. Instead of registering time intervals, infeed positions of the mirror are then expediently registered at least in one first scan. The first measuring event can thus take on the appearance that the appertaining motor positions are stored instead of the times t1 through t4 and t1* through t4*. In the second or following measuring events, only the motor positions belonging to the reception levels or envelopes RH1–RH4 of FIG. 4 are then still approached. Either the motor positions respectively allocated to the time ranges t1 through t1*, t2 through t2*, etc., can be continuously or steadily traversed, i.e. the cores of the light waveguides to be measured are continuously swept with the light spot respectively only during the time intervals t1 through t1*, t2 through t2*, etc. As a result thereof, the demands made of the positioning precision of the light spot onto the fiber cores advantageously need not be especially high. By comparison thereto, the light spot, which is triggered as a control event of the reception side, can also be expediently set only to the individual motor positions belonging to the maximums RM1 through RM4, so that only the maximum value of the power level is respectively measured at the reception side. This offers the advantage of an improved exploitation of the transmission element, a simpler evaluation at the reception side (only respectively one measured value per reception level), but requires a higher positioning precision in order to respectively obtain reproducible measurements. Expedient, additional control elements are then to be provided for the drive element of the movable mirror, these enabling a controlled, step-by-step or discontinuous deflection motion of the mirror.

After this first registration of the time slots of the reception levels RH1 through RH4 of the reception radiation fields RF1 through RF4, control events of the reception side are now triggered in FIG. 11 in subsequent measurements based on this registration. For determining the light powers of the reception radiation fields RF1 through RF4, the switch SW in the optical receiver OR1 of FIG. 11 is switched between two positions P1 and P2 by the central processor unit CPU via a control line SWL corresponding to the prescribed time frame (having the identified time slots) from the first measurement, i.e. corresponding to the chronological sequence of the reception radiation fields acquired by the light-sensitive element GLE. The switch SW is in the position P2 during the transmission times t1 through t1*, t2 through t2*, t3 through t3* as well as t4 through t4*. As a result thereof, the chronologically successively arriving reception signals DS2 of the reception radiation fields RF1 through RFn, with n=4, are supplied to an integrator INT in the optical receiver OR1 with the switch in the position P2. This respectively integrates the area under the envelopes RH1 through RH4 of FIG. 14 at the time of their leading level edge up through the time of their trailing level edge. During the transmission pauses or, respectively, "dead times" tA through t1, t1* through t2, t2* through t3, t3* through t4 and t4* through tE, by contrast, the switch SW assumes the position P1. In this position, reception signals can proceed neither to the evaluation means AE1 nor to the integrator INT, thus, the switch SW in position P1 disconnects the optical receiver OR1 from the evaluation means AE1, for example it is up in the "air". As a trigger means of the reception side of the integrator INT, the switch SW is switched back and forth between the two positions P1 and P2 according to the chronological sequence of the previously registered reception radiation fields, i.e. synchronously with their time slots. What is thereby assured is that the integrator INT, which is a control means of the reception side, respectively integrates the incoming reception signal DS2 only during the respective transmission duration, for example from t1 through t1*. The integrator INT thus respectively selectively identifies the respective overall light power of the momentarily adjacent reception radiation field and forwards this summed-up-measured value to the evaluation means AE1 for further evaluation. The integrator INT is thereby reset to zero by the central processor unit CPU via a control signal RS before every new integration and the measuring event for the next reception radiation field is repeated.

According to the time frame prescribed in FIG. 14, the switch SW of FIG. 11 is in the position P1 during, for example, the duration tA through t1. Upon arrival of the reception radiation field RF1, the switch SW switches over into the position P2, so that the light power of the reception radiation field RF1 is summed up during its transmission time t1 through t1*. After the trailing edge at time t1*, the integration is stopped by switching the switch SW into the position P1, the integration sum is read out and this integration value is transmitted to the evaluation means AE1. The integrator INT is then reset before the arrival at time t2 of the second reception radiation field RH2, so that the light power measurement for the next reception radiation field to arrive, the second reception radiation field here, can begin from the beginning. In an especially expedient way, the integrator INT can be respectively read out and reset approximately in the middle between two neighboring time slots, for example between the two time slots t1 through t1* and t2 through t2* and, thus, in the middle between two levels such as, for example, RH1 and RH2. The integrator offers the advantage that the higher-frequency noise parts no longer play any part in the optical receiver OR1 for the actual measurements, since integration is respectively carried out over the full time slot of the reception radiation fields RF1–RFn, with n=4.

As warranted, these control events of the reception side can also be respectively triggered at the times tM1–tM4 of the maximums RM1–RM4 of the reception levels RH1–RH4 instead of being triggered at the times of the leading and/or trailing edges of the reception levels RH1–RH4. To that end, respectively only the maximums RM1–RM4 are thereby registered as individual measured power values, so that the integrator INT can be advantageously eliminated. An especially exact or "point-like" positioning of the light spot onto the light waveguide cores is expedient for this purpose at the transmission side.

With these selectively acquired light powers of the reception radiation fields RF through RFn with n=4, the transmission power of the transmission element of the transmission/coupling device SK can now be respectively individually controlled for each light waveguide to be measured, and is controlled via at least one feedback loop to the transmission side such as formed, for example, by SL3. The light power control is expediently undertaken with the central processor unit CPU so that reception levels of approximately identical size occur at the reception side for following, actual measurements in the second measuring event at the light waveguides. Level fluctuations, for example maximums RM1 through RM4 of different sizes, as in the case of the reception levels RH1 through RH4 of FIG. 14 in the first scan of the transmission side are thus avoided. Differences in the coupling factors, for example different infeed and outfeed attenuations due to different color coatings of the light waveguides, can be advantageously compensated with the power control of the transmission side. As a result of the level matching of the reception radiation fields of all light waveguides to be measured, the same signal-to-noise ratio and, thus, an optimally uniform exploitation of the optical receiver OR1 respectively occurs with no over-drive or under drive.

As a further control event of the reception side on the basis of the first registration of the chronological distribution of the reception radiation fields RF1 through RFn, it can also be expedient to individually set an amplifier AM for each reception radiation field RF1 through RFn. In FIG. 11, this amplifier AM is entered in broken lines in the line DL2 between the reception element GLE and the switch SW. Via a control line SV that is likewise entered in broken lines and proceeding from the central processor unit CPU, the amplifier AM is switched according to the chronological sequence of the reception radiation fields RF1–RF4 from the first measurement. In this way, a gain factor can be individually set at the reception side for every individual light waveguide, so that a respectively optimum level control of the integrator INT and of the following signal evaluation (SUH) occurs, for example a level matching of the reception side can be preferably achieved. A level matching of the transmission side for compensating the level fluctuations of the reception side can then be potentially eliminated. However, an improvement of the signal-to-noise ratio as in the case of the level matching of the transmission side cannot be effected by the switching or amplification.

It can be expedient for improving the outfeed condition to provide an outfeed optics AO that is entered in broken lines in FIG. 11 between the coupling device KV2 and the light-sensitive element GLE. Expediently, the outfeed optics AO can be individually set for each light waveguide to be measured, and is set with the central processor unit CPU according to the chronological sequence from the first measuring event as an additional control event of the reception side and via a signal line that is not shown here. For example, a spherical lens is preferably suitable as outfeed optics AO.

It may also be potentially expedient given a small-area reception element, that respectively acquires only one radiation field to be measured, to displace this small-area reception element on the basis of the registration of the time slots from the first scan of the transmission side in accordance with this chronological distribution which is used as a control event of the reception side.

In addition, information for controlling the adjustment elements SG1, SG2 of the multiple splice location MS1 of FIG. 11 can also be acquired from the chronological distribution RP of the first measuring event. To that end, a relative measurement is expediently implemented wherein each light waveguide is first aligned for maximum transmission and the appertaining level is then used as reference value. It proceeds from FIG. 14 or from the display image of the display means DSP1 of FIG. 11, that the reception radiation field RF3 allocated to the light waveguide combination LW3/LW3* has the relative reception level RH3 having the lowest maximum RM3. The reception radiation field RF4 allocated to the light waveguide LW4, by contrast, has the highest relative reception level RH4 within the group of four light waveguides LW1 through LW4 to be measured. While light is infed, guided and outfed nearly ideally, i.e. without attenuation losses, in the light waveguide combination LW4/LW4*, the light waveguide pair LW3/LW3* has the highest attenuation. The adjustment elements SG1 and SG2 can be operated with control signals SS1, SS2 via control lines SL1, SL2 proceeding from the central processor unit CPU. As a result thereof, the two ribbons BL1 and BL2 can preferably be shifted relative to one another so that a maximum relative reception level before the splicing event respectively occurs in common or simultaneously for all measured reception levels RH1 through RH4.

On the basis of the first registration of the chronological distribution of the reception levels, the control of the splice or welding event for the two ribbons BL1 and BL2 to be connected to one another can also be expediently triggered as a control event of the reception side. The central processor unit CPU thereby controls the welding time so that the maximally possible reception level occurs at the reception side for all light waveguide combinations LW1/LW1* through LW4/LW4* when considered together, for example, simultaneously.

The measuring instrument or means ME of FIG. 11 works in an especially advantageous way with a periodic deflection of the light beam of the transmission radiation field at the transmission side in order to enable a quasicontinuous measurement. This periodic deflection, for example, can be achieved in that a tiltable mirror, which is beam deflecting means in the transmission/coupling device SK, is periodically turned back and forth by a galvanometer scanner. Due to the mass moment of inertia of the mirror, this movement of the mirror ensues sinusoidally, for example its rotational angle φ is sinusoidally dependent on the time t. What is thus involved is a non-linear scan motion of the transmission beam.

Figure 12:
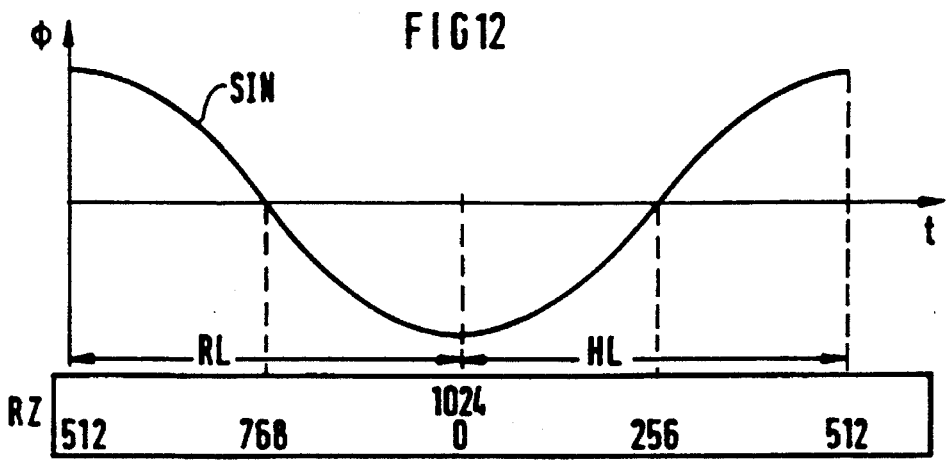
FIG. 12 is a graph illustrating the curve of a transmission side, sinusoidal beam deflection motion with the measuring instrument of FIG. 11.

FIG. 12 shows the sinusoidal curve SIN of the rotational angle φ dependent on the time t. The mirror rotation is expediently converted with the assistance of an optical system such as, for example, a spherical lens in the transmission/coupling device SK into an angle-proportional excursion of the light spot of the transmission radiation field from the central position, so that the position of the light spot on the ribbon during the scan of the transmission side is likewise sinusoidally dependent on the time. In order to assure a fixed chronological allocation and a defined relationship between the infeed of the transmission side and the outfeed of the reception side, the control of the scanner motion occurs directly with the central processor unit CPU in the evaluation means AE1, preferably with a processor. A fixed chronological allocation of all control and measuring events in the measuring instrument ME of FIG. 11 relative to the current position of the light spot can thereby be achieved.

In a practical exemplary embodiment, the processor generates, for example, a time grid of 50 μsec. A square-wave signal is generated from this time grid with the signal changing the level every 512 raster points of the time grid. One period of the time grid thus has 1024 raster points, which corresponds to a frequency of approximately 20 Hz. The period of 1024 raster points is co-counted in the processor with a time grid counter that counts from 0 through 1023 in order to then begin anew at 0. The desired, sinusoidal drive signal AS2 (FIG. 11) for the scanner is acquired from the 20 Hz square-wave signal by analog filtering in the scanner control ASV1. What is thus achieved by this synchronization of the scanner movement with the generated time grid is that a specific location of the light spot in the transmission/coupling device SK reproducibly corresponds to every counter reading of the time grid counter, for example, to every raster point. For illustrating the allocation between the raster points of the time grid counter and the sinusoidal scanner or light spot motion, the time grid RZ is entered below the time axis t in FIG. 12.

Figure 13:
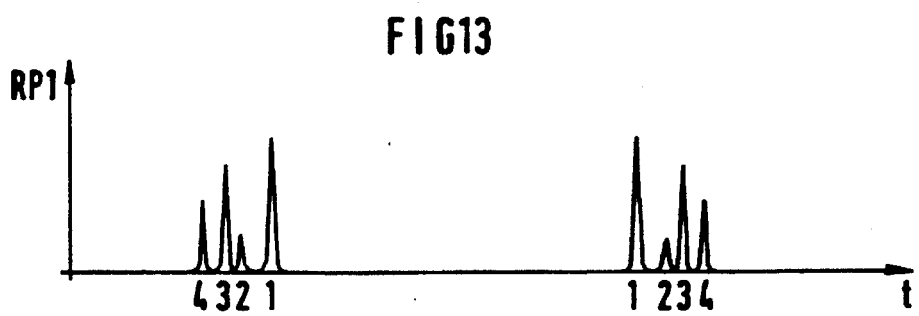
FIG. 13 is a graphic illustration of the reception levels obtained from four light waveguides subjected to beam deflection motion of FIG. 12.

During following, actual measurement, the light spot or luminous spot is periodically deflected across the light waveguide to be measured, and is deflected with a sinusoidal time-dependency. At those times at which the spot impinges a fiber core, light is supplied thereinto. This test light is in turn coupled out at the receiver side and generates an appertaining, specific reception level in the chronological curve of the receiver output signal. Such a selective reception level arrives every time when the core of a light waveguide to be measured is impinged by the light spot at the transmission side, for example, twice per light waveguide and period due to the sinusoidal movement of the light spot. In order to significantly utilize the linear part of the sine motion and in order to reliably sweep all light waveguides to be measured with the light spot at the transmission side, the amplitude of the beam deflection is expediently selected larger than the width of the light waveguide ribbon to be measured. As a result thereof, two groups of reception levels respectively derive at the reception side per period, namely one for the leading edge or first half-wave of the sine function (advancing beam HL in FIG. 12) and one for the trailing edge (returning beam RL in FIG. 12). FIG. 13 shows a chronological distribution RP1 for, for example, four light waveguides of the two ribbons of FIG. 11 to be measured given a non-linear motion of the transmission radiation field. The four levels of the first group are thereby allocated to the returning beam RL (first half-wave of the sine function) but the second group are allocated to the advancing beam HL (second half-wave of the sine function) of FIG. 12. One of the four light waveguides in the ribbon to be measured can be unambiguously allocated to each reception level, whereby the reception level of the light waveguides to be measured appear in the inverse chronological sequence during the return of the beam. This is illustrated in FIG. 13 in that respective fiber numbers from 1 through 4 are allocated to the two groups of reception levels. During the advance HL, the light waveguides having the numbers 1 through 4 are measured in an ascending sequence, whereas the light waveguides having the numbers 4 through 1 are measured in a descending sequence during the return RL. For purposes of simplifying further considerations, only the advance HL shall be considered below.

In order to be able to recognize the individual fiber cores of the light waveguides in the chronological course of the receiver output signal as well as in order to make conclusions about the relative light power transmitted across the splice location MS1 of FIG. 11 from the height and/or the area of the reception levels, the following, two measuring events are expediently implemented in the present exemplary embodiment:

FIRST MEASURING EVENT

Figure 15:
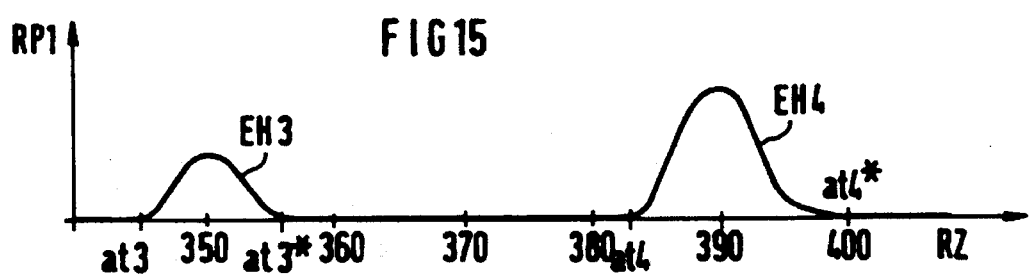
FIG. 15 is an enlarged graphical view showing the reception level of two of the neighboring light waveguides of FIG. 13.

In at least one first scan of the transmission radiation field of the transmission side, this is preferably operated with a constant transmission power. At the reception side, the digitization element SUH samples the generated reception signals DS2 per raster point, which is every 50 μsec in the example, and stores the digitized sample acquired in this way in the measured value memory MEM allocated to the central processor unit CPU. The time grid counter of the processor thereby preferably supplies the memory address for the respective sample. This procedure is repeated during the entire advance HL, which is for 512 raster points in the exemplary embodiment, so that 512 samples reside in the memory MEM for one advance. These 512 samples represent the chronological curve of the receiver output signal. Due to the chronologically equidistant sampling, the position of the samples in the memory (memory address) corresponds to the time. Due to the synchronization of the scanner motion with the time grid counter of the central processor unit CPU, particularly with the processor, one location of the light spot in the coupling region of the transmission/coupling device SK can also be allocated to every memory address even though a non-linear scan motion of the transmission side is involved. Expediently, the number of samplings is selected substantially higher than the number of light waveguides to be measured, so that a respective plurality of samples occur for every reception level. FIG. 15 shows the chronological distribution RP1 of the envelopes EH3 and EH4 of the samples for the reception levels of the light waveguides 3 and 4 from FIG. 13 in an enlarged illustration over the time grid RZ. The time slots of these two envelopes EH3 and EH4 are identified with the evaluation means AE1. The envelope EH3 has the time slot between its leading and its trailing edge, for example, between the times at3 and at3* allocated to it. Correspondingly thereto, the envelope EH4 has its time slot between the times at4 and at4*. For the additional signal processing, these times at which the envelopes begin and end are stored with the central processor unit CPU. Given digital signal processing, this means that the addresses of the samples at which the respective envelope begins and ends is stored in the memory MEM for every light waveguide to be measured. These addresses thereby correspond to the appertaining counter reading of the time grid counter of the central processor unit CPU. In this way, a time sequence having time spans at which transmission is carried out, for example between at3 and at3*, and at which a transmission pause is inserted, for example between at3* and at4, is obtained. As warranted, this first measuring event is repeated again at least once in order to acquire all reception radiation fields of the light waveguides to be measured as exactly as possible with respect to their time slots. In practice, namely, there is the difficulty that the light-sensitive element can only be respectively driven by one of the light waveguides to be measured, so that an optimum signal-to-noise ratio only occurs for this one light waveguide to be measured. A switching to individual gain factors for every individual light waveguide can then be avoided in that the transmission power is varied at the transmission side, so that an adequate signal-to-noise ratio can be set at the reception side for each reception radiation field to be measured.

SECOND MEASURING EVENT

For the second, actual measuring event, at least one scan of the transmission radiation field is implemented at the transmission side. A periodic scan of the transmission radiation field is expedient for a quasi-continuous pick-up of measured values. In the second measuring event, the light power transmitted between the transmission side and the reception side is acquired for every individual light waveguide. Respective conclusions about the chronological curve of the attenuation in the light waveguide can then be drawn from the percentage change in the chronological curve of the transmitted light power of every individual light waveguide to be measured. In order to keep the influence of disturbing quantities such as, for example, noise of the optical receiver OR1 as slight as possible, it is not the height of the reception levels, for example their maximums, that is acquired in the evaluation but the area under their envelopes. The measurement of the area under the envelopes such as, for example, EH3 and EH4 expediently ensues, for example, by analog integration. To that end, the integrator INT in FIG. 11 precedes the evaluation means AE1, so that it is activated or deactivated by the central processor unit CPU corresponding to the time slots of the previously registered reception radiation fields. Because the chronological positions (time slots) of the envelopes of the reception levels are already known from the first measuring event, the chronologically exact control of the integrator is possible via the control line SWL proceeding from the central processor unit CPU with the switch SW in the desired position. For controlling the integrator INT, the addresses for the start and end of the envelopes of the reception levels that are stored in the first measuring event are respectively used when obtaining a digital signal evaluation. First, the integrator INT is reset via the control line RS, whereby the switch SW is in the position P1. At the time of the leading edge of the reception level envelope of the first light waveguide, the integrator INT is switched with the switch SW into the mode "integrating". The switch SW is thereby in the position P2. The integrator INT is stopped at the point of time of the trailing edge of the envelope. To that end, the switch SW switches back into the position P1. The voltage at the integrator output is now proportional to the area under the measured envelopes. Digitized, this value is supplied to the processor unit CPU for further evaluation and is retained thereat. Subsequently, the integrator INT is reset, the area under the next arriving envelope is integrated and read out, etc. . .

In order to largely preclude the influence of "jitter" effects or fluctuations of the chronological position of the reception levels or their envelopes due to slight irregularities in the scanner motion, the switching times for the integrator INT in practice are not directly respectively fixed at the time of the leading and the time of the trailing edge but are preferably fixed approximately in the middle, for example in the valley between two envelopes. Given period measurement, a measured value for the respective light power of the appertaining reception radiation field is obtained in every period of the sine function for each fiber to be measured. Given four fibers and a repetition rate of 20 Hz, one thus obtains 20×4 measured values per second. Given additional evaluation of the return, even twice as many measured values are available. In a splicing device, the registered reception levels represent measured attenuation values that the central processor unit CPU further evaluates for controlling the splicing procedure.

Figure 16:
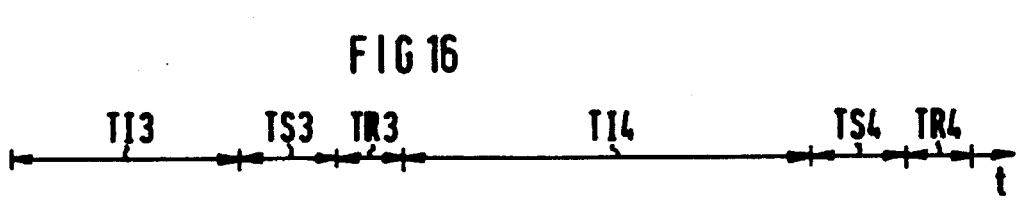
FIG. 16 is a schematic view of the time frame of the reception side integrator in an optical receiver of the measuring instrument of FIG. 11.

FIG. 16 shows the time frame with which the integrator INT works for the reception levels or, respectively, their envelopes EH3 and EH4 from FIG. 15. During the chronological duration TI3, which is selected somewhat longer than the chronological duration at3*–at3 of the envelope EH3 of FIG. 15, the integrator INT is set to the operating mode of "integrating". The measured value that has been integrated up is read out from the integrator in the following chronological duration TS3 and is forwarded to the evaluation means AE1 of FIG. 11. Subsequently, the integrator INT is reset during the chronological duration TR3, whereby the time span TR3 lies approximately in the middle between the two envelopes EH3 and EH4 of FIG. 15. Analogous to its three operating conditions for the chronological durations TI3, TS3 and TR3 of envelope EH3, the integrator INT for the envelope EH4 of FIG. 15 which follows chronologically later is switched during the chronological durations TI4, TS4 and TR4.

In practice, it is particularly different color applications on the light waveguides of a ribbon to be measured that lead to reception levels of different height during reception, i.e. to level fluctuations. Since receiver circuits that can be practically realized are usually designed only for a narrow operating range in view of the light power that can be evaluated, excessively high reception levels lead to an overdrive of the optical receiver and excessively low reception levels lead to imprecisions (underdrive) due, for example, to the receiver noise or due to the poor resolution of the analog-to-digital converter in the digitization element. The transmission power can be individually advantageously set for each light waveguide to be measured using the information acquired in the first measuring event regarding position and height of the reception levels or envelopes so that the reception levels in the second measuring event, i.e. for the actual measurements, all have approximately the same height. As a result thereof and since the optical receiver can be respectively optimally driven for all light waveguides to be measured, the obtainable precision of the signal editing can be optimized for each light waveguide to be measured. The control of the transmission power at the transmission side is thereby implemented proceeding from the reception side on the basis of the control line SL3 as a type of "feedback loop". The switching of the individually adjustable transmission powers for every light waveguide to be measured is expediently implemented at the same times at which the integrator INT at the reception side is also switched. The transmission side is thus chronologically controlled with respect to the transmission power in accord with the time frame acquired in the first measuring event. It can be expedient to provisionally fix the transmission powers after the first measuring event and to implement a "test run" for the second measuring event with these powers, which correspond to the measured values from this test run, and then correct the transmission powers again for following measurements and to thereby again improve the measuring precision.

In that the transmission element in the optical transmitter of the transmission/coupling device SK of FIG. 11 is only respectively activated when a reception level is anticipated at the reception side in accord with the time frame, an unnecessary stressing of the transmission element is advantageously avoided. The power consumption for the transmission element is lowered and its useful life is enhanced in this way. The transmission element can work in pulsed mode in an especially expedient way, so that higher light powers can be coupled into the light waveguides to be measured.

In order to be able to couple light into one or more light waveguides LW1 through LWn to be measured at the transmission side, these light waveguides are coupled with the coupling device KV1 according to FIG. 2 along an arbitrarily prescribable section of their longitudinal extent, and are coupled according to the flex coupler principle. Given a plurality of light waveguides LW1 through LWn, as in FIG. 2, these can be expediently mechanically combined to form an approximately rectangular ribbon conductor BL1. The outer envelope of the ribbon conductor BL1 is indicated with dot-dash lines in the right-hand part of FIG. 2 and has been omitted in the remaining parts of the figure for the sake of clarity. For the sake of simplicity, the light waveguides LW1 through LWn in FIG. 2 have been shown only in the region of the coupling device KV1 and have otherwise been omitted.

The sweep with the light spot LF in FIG. 2 can also potentially be implemented so that it is moved back and forth in the y-direction, for example, is swept in the fashion of a "jitter" motion, at least respectively in the region of the respective infeed location when sweeping the respective light waveguide core. Given a step-by-step scan motion in the y-direction, the beam and spot can preferably have an additional rotational motion that is faster in comparison to the motion superimposed on the beam during the illumination of the respective light waveguide. Expediently, the light spot is moved back and forth between 4 and 10 times, preferably 5 times, while it is aligned onto the core of the respective light waveguide.

When, given the light infeed of the transmission side of FIG. 2, for example, one assumes that the radiation field SF is focused in a focal point FP, the light rays LS1–LSk of the radiation field SF would converge in the tip of a beam cone given the absence of the coupling device KV1 and would then in turn diverge beam-shaped following this focal point.

Figure 21:
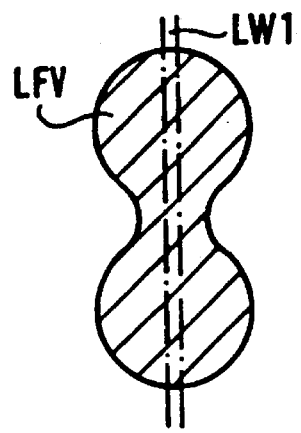
FIG. 21 is a schematic illustration of an unsharp light spot along a respective infeed section given a light infeed without an optical wedge of FIG. 2.

In FIG. 2, the focal point FP of the radiation field SF is respectively projected onto the curved section of the respective light waveguide, for example, LW1, insofar as possible. Due to the curvature of the light waveguide LW1, however, this is not sharply illuminated in a punctiform fashion; rather, the light rays of the ray cone also impinge the light waveguide LW1 along its longitudinal axis at locations preceding and following the focusing point FP. At these locations, the radiation field SF is particularly spread in comparison to the core diameter of the light waveguide LW1 and is not focused, so that it is unsharply imaged thereat and light parts are lost due to "overshooting" of the light waveguide core. When, for example, the light rays LS1–LSk in FIG. 2 proceed in the x, y-infeed plane, then the light ray LSk, for example, traverses a shorter path from the infeed optics EO to its point of incidence at the light waveguide LW1 than, for example, does the light ray LS1 due to the curvature of the light waveguide. As a result thereof, the light waveguide LW1 is also impinged by the beam cone along its curvature preceding and following the actual focusing point FP and, due to the unsharpness present thereat, is illuminated with a far lower luminance. In this way, an infeed section extending along the longitudinal axis of the light waveguide LW1 is illuminated, for example, with a light spot LFV as is schematically shown with shading in FIG. 21. The light spot LFV has the approximate shape of a "figure eight" along the longitudinal axis of the light waveguide LW1 that is indicated with dot-dash lines. While the spot LFV is imaged largely focused onto the light waveguide LW1 in approximately its center, the spot LFV diverges preceding and following this sharp zone lobe-like, and in the y-direction, when viewed along the curvature of the light waveguide LW1, so that the light waveguide LW1 is irradiated thereat with far lower luminance than in the middle of the light spot LFV. The light spot LFV is thus unsharply imaged onto the light waveguide LW1 in the region of its two spread or lobe-like zones. Fewer light rays are projected onto the core of the light waveguide and are coupled therein. The majority of the light rays does not impinge on the light waveguide but beside it. Viewed overall, a non-uniformly spread light spot LFV occurs along the longitudinal axis of the light waveguide LW1.

This unsharpness problem can also particularly occur given a light spot according to FIGS. 9 and 10, which has a greater spatial expanse in the z-direction than in the scan direction y.

In order to be able to couple optimally many light parts of the transmission radiation field available into the light waveguide to be respectively measured such as, for example, LW1 of FIG. 2, and in order to be able to improve the coupling efficiency, a focusing surface is generated for the transmission radiation field SF of FIG. 2 that is inclined in the direction toward the infeed surface of the infeed section relative to an imaginary plane y, z, which extends perpendicular to the beam direction x. By way of example, FIG. 17 shows such an inclined focusing surface that is provided with reference character FC1.

Figure 17:
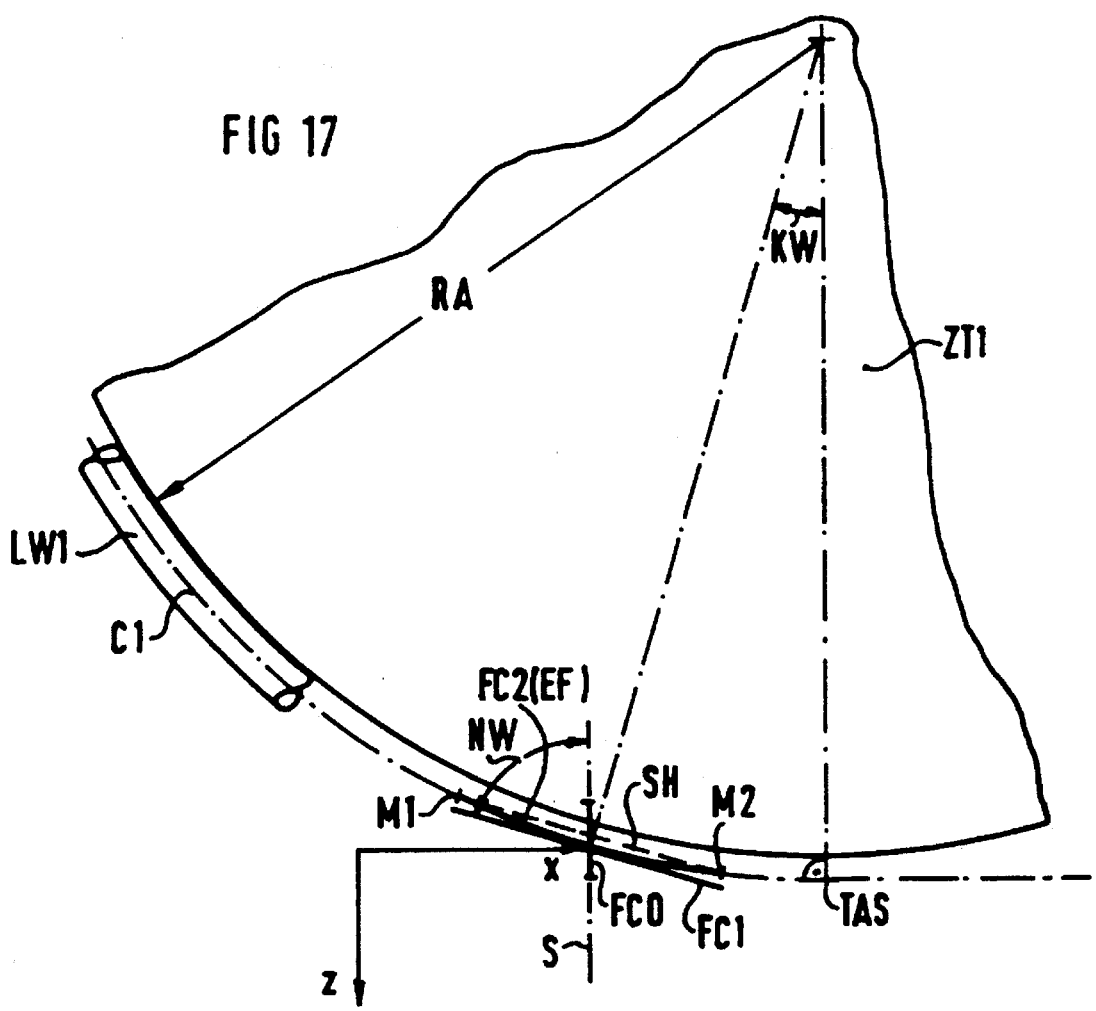
FIG. 17 is a schematic presentation of the coupling device of FIG. 2, wherein the infeed section of the light waveguide to be measured proceeds with an allocated focusing line.

FIG. 17 shows a portion of the x, z infeed plane in which the curved section of the light waveguide LW1 proceeds.

The x, z-plane thus corresponds to a plane of section perpendicular to the longitudinal extent of the cylindrical bending arbor ZT1 (see FIG. 2) at the light waveguide LW1, so that the focusing surface FC1 is viewed in a plane extending perpendicular to the scan direction y of the transmission radiation field SF. The light waveguide LW1 in FIG. 17 presses against the outside circumference of the cylinder ZT1. It is shown with its coating envelope (primary and secondary coating) in the left-hand part of FIG. 17, but this coating has been omitted in the rest of the figure for the sake of clarity. The position of the core center of the waveguide LW1 is indicated with broken lines and is provided with the reference character C1. The radiation field SF is then imaged so that the focusing surface FC1 appears in the x,z infeed angle as a straight-line image or a focusing line. This focusing line is placed at an angle in the direction toward the core position C1 of the light waveguide LW1 by comparison to an imaginary, perpendicular auxiliary line S indicated with broken lines that proceeds parallel to the z-axis. The focusing surface FC1 has its image line (focusing line) extending in the x-z-plane approximately parallel to a chord SH of an infeed section impinged by the light, which chord extends between a start or point M1 and an end or point M2. The focusing line (of the focusing surface FC1) is preferably applied as tangentially as possible to the core position C1 approximately on the middle of this infeed section.

Expediently, the longitudinal extent of the focusing surface FC1 roughly corresponds to the chord length of the chord SH. Expediently, the focusing line has a longitudinal extent between 600 and 2000 µm, particularly between 800 and 1600 µm, and preferably approximately 800 µm. That point at which the focusing line forms a tangent to the core position C1 is preferably allocated to a curvature angle KW. The curvature angle KW occurs between the tangent point and a location TAS of the light waveguide LW1 at which the light waveguide lifts off from the cylindrical bending arbor ZT1 and departs the arbor on a straight line. The light waveguide LW1 is preferably illuminated in the end region of its curvature and adjacent the transition to its straight-line section, so that emission losses or an undesired light outfeed due to an additional curved course of the light waveguide is largely avoided. Given a curvature radius RA of approximately 3 mm, the curvature angle KW is expediently selected between 6° and 12°, preferably at approximately 8°.

The obliquely placed focusing surface FC1 of FIG. 2 preferably has a greater spatial expanse along the longitudinal axis of the curved light waveguide section than in the scan direction v of the radiation field SF. In particular, it forms an inclined focusing plane in the projection space having an approximately line-shaped or a strip-shaped or a thin oval form or shape.

Given a stationary alignment of the radiation field SF onto the core of the light waveguide to be respectively measured such as, for example, LW1, the focusing field width of the inclined focusing surface FC1 in the scan direction y, in particular, is smaller than the core spacing of two neighboring light waveguides, for example, LW1, LW2, and this corresponds to a generally valid upper limit for the field width. The field width is preferably selected at most to be equal to the light waveguide outside diameter (particularly, for example, below approximately 250 µm) and at least equal to the core diameter (for example, between 10 and 50 µm) in order to be able to impinge the respective core as reliably as possible and in order to couple as much light as possible into the core.

Given a radiation field SF migrating or moving steadily in the scan direction y, the core of the respective light waveguide, such as LW1, is preferably illuminated with a concentrated light spot that is thin, line-shaped in the y-direction insofar as possible. The field width of the focusing surface FC1 in the y-direction is thereby advantageously selected equal to or smaller than the core diameter of the respective light waveguide, such as LW1. Given monomode light waveguides, the focusing surface FC1 preferably has a beam width between 10 and 80 µm and preferably between 10 and 20 µm in the y-direction.

Since the focusing surface FC1 in FIG. 17 is approximated to the course or path of the core C1 as tangentially as possible and roughly in the middle of the infeed section proceeding on a curve, the majority part of the light rays of the radiation field SF advantageously proceeds onto the infeed surface EF of the infeed section between the two markings or points M1 and M2. The available infeed surface EF of the infeed section is thereby particularly defined by its longitudinal extent between the two markings M1 and M2 as well as by the core diameter. A strip-shaped curvature surface as a portion of an imaginary sphere surface thus occurs as the infeed surface EF. In that the focusing line of the focusing surface FC1 in the y, z-plane of FIG. 17 is preferably set in the near range of the core position C1, the light of the radiation field SF is concentrated far more or nearly completely onto the infeed surface EF of the infeed section and is bundle-projected. An optimized infeed efficiency and, thus, a high light yield of the light quantity offered by the transmission element TE of FIG. 2 thus occurs. Due to the obliquely placed focusing surface FC1, approximately the entire infeed section is illuminated with an essentially sharp light spot along the curvature between the two markings M1 and M2, so that losses in the light power due to "overshooting" of the light waveguide core are largely avoided. Thus, compared to the infeed conditions of FIG. 21 far more light rays are coupled into the core of the light waveguide LW1.

Figure 22:
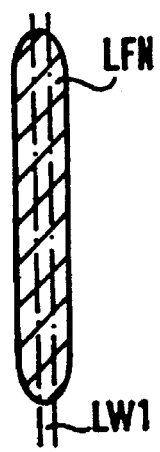
FIG. 22 is a schematic illustration of a light spot sharply imaged onto a respective infeed section given the transmission light infeed with a glass or optical wedge of FIG. 2.

Viewed along the longitudinal axis of the light waveguide LW1 which is indicated with dot-dash lines and is guided in a curved path, FIG. 22 shows a light spot LFN that essentially occurs given an inventive, obliquely set focusing surface such as, for example, FC1 of FIG. 17. Viewed in longitudinal direction of the light waveguide LW1, the light spot LFN has an approximately thinly oval or strip-shaped form. The illumination field width of the spot LFN (in the y-direction) is preferably approximately constant along the curvature of the light waveguide LW1. As a result thereof, the infeed surface of the infeed section is illuminated with approximately the same illumination field strength, for example, with approximately constant luminance in the longitudinal direction. Differing from the non-uniform, unsharp light spot LFV of FIG. 21, the light of the radiation field SF given the inventive light spot LFN of FIG. 22 is homogeneously or uniformly distributed along the curvature of the infeed section, so that an improved infeed factor occurs. Since the shape of the light spot is largely matched to the shape of the infeed section, far more light impinges the light waveguide LW1. The light waveguide LW1 is thus illuminated with a light spot LFN that is essentially sharply set onto a prescribable infeed section. In FIG. 2, this desired, thinly oval shape for the light spot LF1 is indicated with dot-dash lines, and this spot illuminates the curved infeed section TC1 with high depth of field.

A further improvement of the light infeed of the transmission side, particularly with respect to the coupling efficiency, can be achieved in that the focusing surface has its shape essentially matched to the curved infeed surface EF of the infeed section of FIG. 17. The focusing surface is preferably fashioned as a strip-shaped curved surface whose dimensions approximately correspond to that of the infeed surface EF. In FIG. 17, a focusing surface, which follows the curvature of the core position C1, is provided with reference character FC2 and is indicated in the x, z-plane by a solid line between the two markings M1 and M2. Viewed in the x, z-plane of FIG. 17, the focusing surface FC2 then forms a curved image line, whereby the curvature thereof follows the image line of the infeed surface EF. In particular, the surface FC2 is preferably brought into coincidence as exactly as possible with the infeed surface EF of the infeed section, so that the surface FC2 coincides as fully as possible with the infeed surface EF and the distance of the surface FC2 from the core center C1 becomes minimal. Since the light spot is imaged especially sharply along the curved course of the core position C1, and compared to the tangential approach of the focusing surface FC1 to the infeed surface EF, a light infeed that is further improved is thus achieved by the surface FC2.

Figure 18:
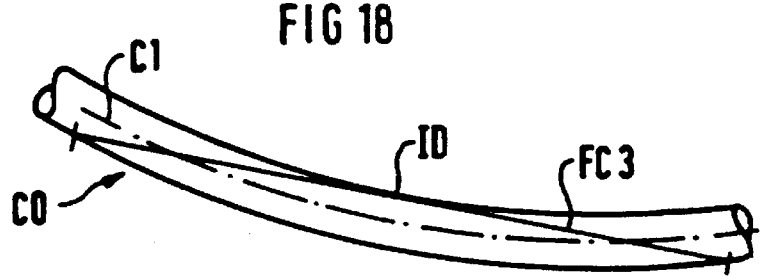
FIG. 18 is a schematic enlarged illustration of the focusing surface of FIG. 17 set in an optimum fashion for the light waveguide core.

FIG. 18 shows a focusing surface FC3 viewed in the x, z-plane that proceeds as fully as possible in the core CO of the light waveguide LW1. Differing from FIG. 17, where the image line of the focusing surface FC1 is tangentially placed against the curved core center C1, the image line of the focusing surface FC3 here forms a tangent to the curved inside diameter ID of the core CO. The two intersections of this image line with the outside diameter of the core CO preferably define the limits of the illuminated infeed section. In this way, the light rays of the radiation field SF are projected directly into the core CO, so that a focused light infeed with a further optimized infeed efficiency advantageously occurs along the curvature of the infeed section.

Figure 23:
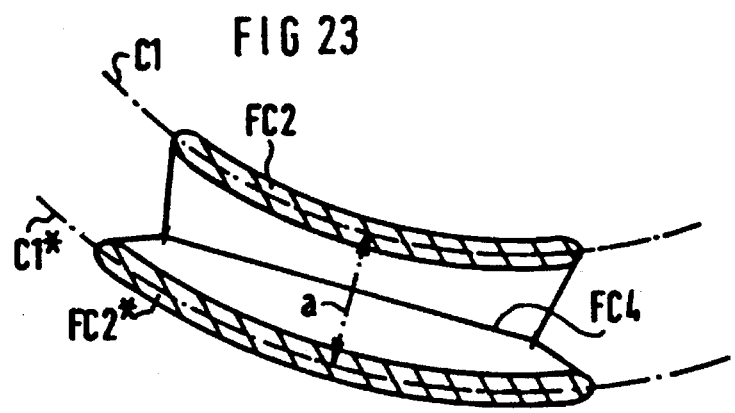
FIG. 23 is a schematic perspective illustration of a focusing surface of FIG. 17 with two different core positions of the light waveguide to be measured.

In addition to the first, inner core position C1 of FIG. 17, FIG. 23 shows a second core position C1* in dot-dash lines in the x, z-plane which lies radially farther toward the outside at the outside circumference of the cylindrical bending arbor ZT1 of FIG. 2. The core position C1 thus has a smaller curvature radius allocated to it than does the core position C1*, so that the two core positions C1 and C1* have a spacing a from one another. The two core positions C1 and C1* can thus represent an inner and an outer limit for the region of possible core courses on the basis of positional tolerances of light waveguide to be measured at the outside circumference of the bending cylinder ZT1 (see FIG. 2). The light of the radiation field SF is concentrated onto a focusing line of a focusing surface FC4 that proceeds approximately in the middle between the two core positions C1 and C1*. The focusing surface FC4 preferably occurs from the focusing surface FC2 of FIG. 17 in that the focusing line thereof is shifted parallel radially outward by approximately a/2 toward the core position C1*. A largely uniform focusing of the radiation field FS onto both possible core positions C1 and C1* is thereby achieved. A symmetrical distribution of the radiation field with respect to the focus line of the focusing surface FC4 thus preferably occurs.

This field distribution is additionally schematically indicated in FIG. 23 in a view given a viewing direction perpendicular to the obliquely placed focusing surface FC4. The light rays of the transmission radiation field SF proceed V-shaped onto the focus line of the focusing surface FC4. They are thereby imaged concentrated in the region of the core position C1 in the form of the focusing surface FC2 of FIG. 17, and this is shown in section in FIG. 23. Correspondingly thereto, the infeed surface of the core position C1* is allocated to a focusing surface FC2* that, analogous to the focusing surface FC2, is fashioned as a strip-shaped curved surface that follows the curvature of the core position C1*. The focus line of FC4 thus respectively expediently proceeds between the core positions C1 and C1* with respect to the propagation direction x.

It is largely assured in this way that light having approximately the same luminance can be infeed in a focused fashion into the respective light waveguide core for every core position such as, for example, C1, C1* and, despite at least two possible, different core positions, the respective infeed section can be respectively illuminated by a sharply set light spot, preferably corresponding to LFN of FIG. 22.

At least one imaging means, particularly a glass wedge GKE, is provided in the transmission/coupling means SK of FIG. 2 for generating the obliquely placed focusing surface of the invention such as, for example, FC1 through FC4 according to FIGS. 2, 3 as well as FIG. 23. This glass wedge GKE is preferably positioned in FIG. 2 between the infeed optics EO and the coupling device KV1, and is indicated with broken lines. The glass wedge GKE is aligned transversely relative to the light rays LS1 through LSk of the transmission radiation field SF, whereby its tapering end points in the negative z-direction. As a result thereof, the light rays LS1 through LSk of the radiation field SF traverse different optical paths in the glass wedge GKE. Viewed in the x, z-plane of FIG. 2, those light rays such as, for example, LSk that traverse a shorter path from the infeed optics EO to the infeed section TC1 are guided in the glass wedge GKE along an optically shorter path such as, for example, KW. Those light rays such as, for example, LS1, by contrast, that traverse a longer path from the infeed optics EO up to the infeed section TC1 are also guided along a longer optical path such as, for example, LW in the glass wedge GKE. It is thus the glass wedge GKE that allows the oblique position of a focusing surface of the invention so that, for example, FC1 of FIG. 17 to be produced in an optical way and to be set in an entirely intentional way. A sharply set, oval light spot as already indicated with dot-dash lines in FIG. 2 then occurs along the curvature of the respective infeed section.

Figure 19:
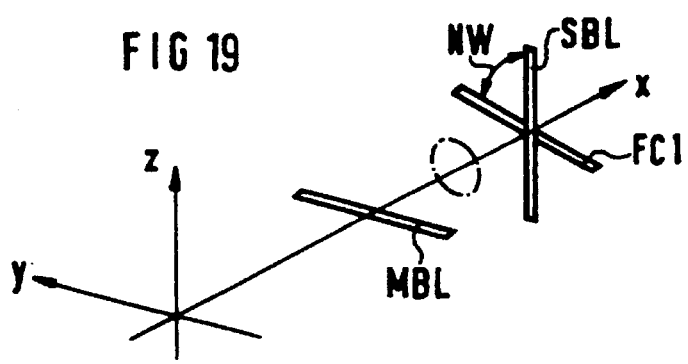
FIG. 19 is a perspective schematical view of two focusing surfaces produced by astigmatism for the light coupling in FIG. 2.

Two so-called astigmatic image surfaces can also be simultaneously potentially generated with the assistance of the glass wedge GKE, these being capable of being advantageously utilized as focusing surfaces for the light infeed. FIG. 19 shows a perspective view of a primary or meridional focusing surface MBL produced by a potential astigmatism of the glass wedge GKE, this focusing surface MBL extending approximately parallel to the scan direction y. FIG. 19 also shows a sagittal or secondary focusing surface SBL extending in the z-direction. The two astigmatic focusing surfaces MBL and SBL thus reside perpendicularly to one another. The focusing surface SBL is fashioned line-like or strip-like or thinly oval in the y, z-plane and the focusing surface MBL is formed line-like or strip-like or thinly oval in the z, y-plane. The light of the transmission radiation field SF along its propagation path in x-direction thus concentrates in the form of the meridional image line MBL and, proceeding therefrom, ultimately continuously merges into the form of the sagittal image line SBL. Roughly in the middle between the two image lines MBL and SBL, the transmission radiation field SF of FIG. 2 thereby assumes a topical field distribution that is approximately circularly fashioned in the y, z plane, and this is indicated with dot-dash lines in FIG. 19. Since, for example, different optical paths in the glass wedge GKE are allocated to the light rays LS1 through LSk in the x, z-plane of FIG. 2, the sagittal image line SBL is inclined toward the x-axis by the angle NW in the x, z-plane, i.e. the sagittal image line SBL is turned around the y-axis by the angle NW, so that the desired focusing surface FC1 of FIG. 17 can be practically generated in an especially simple way upon simultaneous utilization of a potential astigmatism of the glass wedge GKE.

With the assistance of the glass wedge GKE, the focus line generated independently thereof in a focusing surface FC0 (FIG. 17), which preferably has a greater spatial expanse in the z-direction than in the scan direction y like the spot LF of FIG. 9, can, for example, also be potentially placed obliquely or, respectively, at a slant in the x, z-plane by the angle of inclination NW in the direction toward the infeed surface of the infeed section (see FIG. 17). For example, the obliquely placed focusing surface FC1 of FIG. 17 thus occurs. The focusing surface FC1 then advantageously has a slope height in the z-direction that approximately corresponds to the longitudinal extent of the focus line of the focusing surface FC0 along the z-axis. The longitudinal expanse of the focus line of the focusing surface FC0 and, thus, the slope height of the focusing surface FC1 is thereby expediently selected equal to or greater than the maximally possible core position tolerance of the respective light waveguide to be measured in order to be able to compensate positional tolerances of the light waveguide cores. The slope height of FC1 is preferably selected approximately twice the core position tolerance.

For example, the following dimensioning are expedient in order to be able to couple light optimally focused into the core of the light waveguide having, for example, a 230 μm outside diameter and, at the same time, into the core of a light waveguide having, for example, a 400 μm outside diameter (with respect thereto, see the reference quantities in FIG. 17):

Curvature angle KW: 6° through 12°, preferably approximately 8°;

Curvature radius RA for the core axis of the 230 μm fiber: approximately 2.43 mm;

Curvature radius RA for the core axis of the 400 μm fiber: approximately 2.885 mm;

Slope height of the focusing surface FC1: 170 through 200 μm;

Angle of inclination NW: approximately 83°; and

Longitudinal extent of the focusing surface FC1: approximately 1400 μm.

The inventive, inclined focusing surface makes it advantageously possible to focus or to bundle the light of the transmission radiation field along the curvature of the light waveguide core onto the infeed surface of a defined infeed section. The infeed surface of the infeed section is thus uniformly illuminated—as viewed along the longitudinal axis thereof—with a sharply set light spot having a largely homogenous light field strength, i.e. a constant luminance. As a result thereof, the emission losses due to light rays that are not coupled into the core can be minimized, for example the infeed factor can be optimized. Due to the oblique placement of the focusing surface, in addition, the infeed of the transmission side is relatively insensitive to fluctuations and tolerances that occur between the allocation of the transmission radiation field and the respective infeed location at the light waveguide core. In particular, the light infeed will be capable of being prescribed largely independently of positional tolerances of the light waveguide cores such as, for example, due to different ribbon thicknesses or light waveguide diameters of different sizes. In particular, this already also plays a pan with the coating of the light waveguide, which is respectively introduced into the flex coupler and begins to flow as a consequence of the retaining pressure exerted on it and the position of the core thereby changes. However, it is assured due to the slope height of the obliquely placed focusing surface that even cores in various z "altitude positions" of the x, z infeed plane can still be illuminated with a sharply set light spot. Moreover, a significantly better exploitation of the light quantity offered by the transmission element of the optical transmitter is enabled by the homogenized illumination of the infeed surface of the infeed section. Measurements at light waveguides can thus be implemented especially exactly as well as reproducibly.

The transmission-side light infeed of the invention can in fact be particularly preferably employed in conjunction with the statements made about FIGS. 1 through 10. However, it can also be utilized completely independently thereof.

In addition thereto or independently thereof, finally, an improvement of the light infeed of the transmission side can also be achieved in that, in FIG. 2, an optimally point-focused light spot (focusing point FP) or some other light spot LF of the radiation field SF, which is locally limited to the core of the light waveguide, is moved back and forth along the longitudinal axis of the light waveguide to be respectively measured such as, for example, LW1. In order to move the light spot LF of the radiation field SF back and forth along the curved longitudinal axis of the light waveguide LW1 in FIG. 2 to be measured, a tiltable or, respectively, rotatable mirror ULS is provided as deflection means. The mirror ULS is rotatable around a rotational axis DL that is indicated with dot-dash lines and preferably extends in the y-direction. As a result thereof, the light rays LS1 through LSk of the radiation field SF also experience a deflection motion preferably in the z-direction due to the deflection mirror BS in addition to the scan motion in the y-direction, i.e. the radiation field SF is moved back and forth along a displacement line in the z-direction perpendicular to the propagation direction x of the radiation field SF and is also moved back and forth perpendicularly relative to the scan direction y thereof. The back and forth motion of the radiation field SF thereby ensues continuously as well as steadily, so that it uniformly traverses different z-"altitude positions". Due to the scan stroke of the radiation field in z-direction, the light spot LF thereof migrates back and forth along the curvature of the light waveguide LW1. With the assistance of the deflection means, the light spot LF scans a prescribable, curved infeed section of the light waveguide to be measured in the fashion of a "jitter motion", for example the light spot LF is wobbled along the curvature of the infeed section. Due to the back and forth motion (oscillation motion) of the radiation field SF in FIG. 2 in essentially the z-direction, a light spot having a greater spatial expanse in the z-direction than in the scan direction y is generated overall in a scan as viewed in the y, z-plane. The "jitter" motion effects an homogenization or "smearing" of the preferably point-focus light spot in the z-direction, so that an approximately line-like or, respectively, strip-like or thinly oval illumination field in the y, z-plane with privileged direction in the z-direction occurs in the overall view. Due to the longitudinal motion of the radiation field in the z-direction, the infeed surface respectively illuminated by its light spot is "artificially" lengthened along the curvature thereof. During a scan, namely, an illumination field having privileged direction in the z-direction arises as viewed in the y, z-plane. As a result thereof, the light infeed can thus advantageously be made largely independent of fluctuations or tolerances in the z-direction in the infeed means. These, for example, can be positional tolerances of the fiber cores that, for example, are to be attributed to non-uniform thickness or, respectively, inhomogeneous applied thicknesses of the light waveguide coating, core eccentricities, different light waveguide diameters, etc., or, for example, which can also be fluctuations in the geometry of the radiation field. An unambiguous allocation between the radiation field and the respective infeed location at the light waveguide core is thus no longer required in the z-direction.

Given a scan motion of the radiation field SF in the y-direction, the light spot LF is expediently moved back and forth faster along the longitudinal axis of the respective light waveguide such as, for example, LW1 than the spot displaced in the scan direction y. As long as the light spot LF illuminates the two cores of the light waveguide to be respectively measured such as, for example, LW1, it is preferably moved back and forth between 5 and 10 times. A roughly thinly oval illumination field as indicated with dot-dash lines in FIG. 2 for the light spot LF1 thus preferably occurs.

Expediently, the light spot is displaced along a scan distance in the z-direction that at least corresponds to the positional tolerance of the light waveguide cores. In particular, the light spot traverses a scan distance in the z-direction that is twice the maximally possible core position tolerance. Due to the scan motion of the radiation field SF in the z-direction, thus, light spots having a prescribable, arbitrary longitudinal extent in the z-direction (observed in the z, y-plane) are thus advantageously producible. Compared to the astigmatically generated image line SBL of FIG. 19 or FC0 of FIG. 17 as well, light spots having a prescribable, arbitrary longitudinal extent in the z-direction (viewed in the z, y-plane) can be particularly produced. Compared to the astigmatically produced image line SBL of FIG. 19 or FC0 of FIG. 17 as well, light spots that have a significantly greater expanse in the z-direction viewed in the z, y-plane in comparison thereto are particularly enabled.

Preferably with the assistance of the glass wedge GKE of FIG. 2, an inventive slope of the focusing surface that is generated in this way and proceeds in the y, z-plane is then again enabled especially simply in an optical way. The obliquely placed focusing surface (such as, for example, FC1 of FIG. 2) is generated in that the radiation field SF, which has its preferably point-focused light spot moved along a displacement line that is inclined by the glass wedge GKE in the direction to the infeed surface EF of the infeed section TC1 in comparison to an imaginary plane y, z perpendicular to the beam direction x.

Moreover, due to the scan motion of the light spot, for example, LF along the longitudinal extent of the respectively curved light waveguide LW1, the light infeed can also be made potentially independent of the luminance distribution within the illumination field of the light spot at the infeed location along the longitudinal axis of the respective light waveguide.

Figure 20:
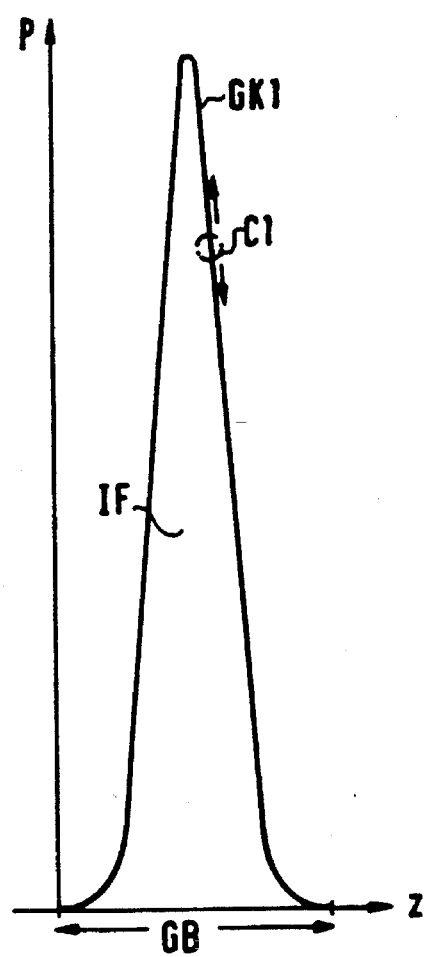
FIG. 20 is a graphical presentation of the topically dependent emission characteristics of the transmission radiation field at the coupling location in the device or arrangement of FIG. 2.

By way of example, FIG. 20 shows a topically dependent power distribution curve GK1 for the power P of the light spot LF of FIG. 2 in the y, z-plane measured relative to the z-direction. The curve GK1 for the z-location dependent power distribution P in FIG. 20 has, for example, a Gaussian shape. If, for example, the core C1 of the light waveguide LW1 were to lie at the z-location of the power maximum, then more light would be coupled into it than, for example, given a z-position of the core C1 that lies under the trailing edge of the curve GK1. Different quantities of light would thus be coupled into the light waveguide core during the chronological duration of a measurement dependent on the core position. In order to then achieve a coupling of a specific, prescribable light quantity into the light waveguide, which coupling is in a respectively controllable way and measurable, an approximately constant power level over a defined measuring duration can be respectively generated by the "jitter" motion of the light spot LF of the invention along the curvature of the respective infeed section. To that end, the radiation field SF of FIG. 2 preferably executes a scan motion in the z-direction with at least one scan. What is thereby important is that a relative motion between the core C1 and the power distribution P is carried out. As a result thereof, nearly the majority part of the light quantity made available by the transmission element of the optical transmitter can be coupled into the core such as, for example, C1 of the respective light waveguide LW1. When traversing, for example, the Gaussian intensity distribution P along the Gauss width GB in the z-direction, a light quantity is coupled into the core C1 overall that approximately corresponds to the integral of the power P of the curve GK1, for example, to the area IF under the curve GK1 of FIG. 20.

In this way, nearly all of the offered light quantity can be coupled into the light waveguide to be respectively measured. The light infeed thereby becomes advantageously independent of the specific, topically dependent emission characteristic of the transmission element or of its appertaining radiation field. Further, the light infeed is far less sensitive to mechanical and temperature-dependent changes in the infeed means, particularly in view of the allocation between the radiation field and the respective infeed location at the light waveguide core.

The z-scan motion of the light spot is particularly suitable in combination with the y-scan motion according to the inventive measuring method of FIGS. 1 through 10, since fluctuations of the infed light power level are largely avoided and, thus, a pulse mode is enabled in an especially reliable way.

In addition thereto or independently thereof, the light infeed can also potentially be made independent of the topically dependent emission characteristic within a prescribed light spot expanse in that specific filters are provided in the radiation field that transform the topically dependent intensity distribution such as, for example, the z-dependent Gauss curve into an approximately rectangular intensity distribution, so that the light power is constant independently of the location, particularly of the z-location. Such a filter is indicated with dot-dash lines in the beam path of the radiation field SF in FIG. 2 and is provided with the reference character FI.

Although various minor modifications may be suggested by those versed in the art, it should be understood that we wish to embody within the scope of the patent granted hereon all such modifications as reasonably and properly come within the scope of our contribution to the art.

We claim:

1. In a method for measuring a plurality of light waveguides arranged side-by-side comprising coupling light into the infeed section of each of the waveguides, decoupling light from an outfeed section of each of the waveguides, and evaluating the decoupled light, the improvements comprising the step of coupling including creating a light spot of a transmission radiation field on a transmission side and moving said light spot in a scan direction in a chronological succession across the infeed sections of the light waveguides to be measured extending side-by-side to couple the light therein, and said step of decoupling including acquiring reception field radiations on a reception side from each of the light waveguides to be measured from the outfeed sections in their chronological distribution relative to one another, said step of evaluating including evaluating the reception radiation fields in their chronological distribution, and controlling the light spot of the transmission radiation field on the transmission side for coupling light into the infeed section of each waveguide to be measured in response to the evaluation of the chronological distribution of the reception radiation fields on the reception side decoupled from the waveguide to be measured.

2. In a method according to claim 1, wherein the step of evaluating the chronological distribution of the reception radiation fields identifies the topical position of the light waveguides to be measured.

3. In a method according to claim 2, wherein the step of evaluating includes displaying and registering the topical position of the light waveguides to be measured identified during evaluation of the chronological distribution of the reception radiation fields.

4. In a method according to claim 1, wherein the step of evaluating the reception radiation fields identifies the light power of each of said fields from the chronological distribution thereof.

5. In a method according to claim 4, wherein the light power of the light spot of the transmission radiation field on the transmission side is controlled in response to the evaluated light power of the reception radiation fields in the reception side.

6. In a method according to claim 4, which includes displaying and registering the light powers of the reception fields for each of the individual light waveguides to be measured.

7. In a method according to claim 1, wherein the step of creating the light spot spatially images the light spot on the infeed sections with the light spot having a greater expanse in a direction extending perpendicular to the propagation direction of the transmission radiation field than the expanse of the light spot in the scan direction and wherein the step of moving the light spot scans the light spot in a chronological fashion across the infeed sections of the light waveguides to be measured.

8. In a method according to claim 7, wherein the step of imaging the radiation field creates a line-shaped light spot generated perpendicular to the propagation direction of the transmission field.

9. In a method according to claim 1, wherein the step of coupling light into infeed sections includes sweeping the light spot of the transmission field across the waveguides to be measured in several sweeps, said step of decoupling the light of the reception radiation fields in a chronological distribution includes registering and retaining at least the chronological distribution of reception radiations fields formed during at least the first sweep of the transmission radiation field and includes the step of controlling the events on the reception side and subsequent measurements on the basis of this registration.

10. In a method according to claim 9, which includes providing an integrator and integrating subsequent reception radiation fields to determine the light power of said subsequent successively acquired reception radiation fields for the step of evaluating.

11. In a method according to claim 9, which includes amplifying the chronologically successively acquired reception radiation fields and controlling said amplifier by the information registered and retained during said at least first sweep.

12. In a method according to claim 1, wherein the step of coupling light includes bending the waveguides to be measured according to a flex coupler principle and focusing the transmission radiation field of the light spot to be inclined in a direction to the infeed surface of an infeed section relative to an imaginary first plane extending perpendicular to the beam direction along the curved waveguide to be measured respectively.

13. In a method according to claim 12, wherein the focusing surface taken in a second plane extending parallel to the beam direction in the respective waveguide to be measured is inclined as a focusing line approximately parallel to a chord of the curved portion of the infeed section.

14. In a method according to claim 13, wherein the slope of the height for the inclined focusing line set in said second plane, said slope height being selected approximately equal to or greater than the maximum possible core position tolerance of the light waveguide to be measured.

15. In a method according to claim 13, wherein the step of focusing the line in said second plane places the line as tangential as possible approximately to the middle of the infeed section.

16. In a method according to claim 12, wherein the step of focusing the focus surface matches the focus surface to the shape of the infeed surface of the infeed section.

17. In a method according to claim 12, wherein the step of focusing the beam brings the beam in coincidence with the infeed surface of the infeed section.

18. In a method according to claim 12, wherein the method of focusing the transmission radiation fields spatially images the field on the focusing surface with a larger spatial expanse in a longitudinal direction of the curved light waveguide section than the expanse in the direction of scanning.

19. In a method according to claim 12, wherein the step of focusing the transmission radiation field concentrates the field in a beam path to two astigmatic image surfaces.

20. In a method according to claim 1, wherein the step of coupling includes bending the waveguides to be measured according to a flex coupler principle, and shifting the light spot of the transmission radiation field back and forth along a longitudinal axis of said light waveguide to be measured in which it is being coupled into.

21. In a method according to claim 20, wherein the step of moving the transmission radiation field back and forth along a displacement line which extends perpendicular to the propagation direction of the transmission radiation field in the waveguide to be measured and to the scan direction thereof.

22. In a method according to claim 20, wherein the light spot is moved in a scan direction extending perpendicular to a plane including the propagation direction and is moved back and forth along the longitudinal axis of each waveguide to be measured faster than it is displaced in the scan direction.

23. In a method according to claim 1, wherein the step of evaluating the reception radiation fields identifies the sequence of light-guiding infeed time intervals during which light is guided in the waveguides to be measured from the chronological distribution of the reception radiation fields.

24. In a method according to claim 23, wherein the infeed time intervals of the light spot of the transmission radiation field on the transmission side is controlled in response to the evaluated light-guiding infeed time intervals of the reception radiation fields on the reception side.

25. In a method for measuring a plurality of light waveguides arranged side-by-side comprising coupling light into the infeed section of each of the waveguides, decoupling light from an outfeed section of each of the waveguides, and evaluating the decoupled light, the improvements comprising the step of coupling including creating a light spot of a transmission radiation field, moving said light spot in a chronological succession across the infeed sections of the light waveguides extending side-by-side to couple the light therein., and said step of decoupling including acquiring reception field radiations from each of the light waveguides from the outfeed sections in their chronological distribution relative to one another, said step of evaluating including evaluating the reception radiation fields in their chronological distribution, said method obtaining at least one reference measurement by sweeping the light spot along the infeed sections of the waveguides, obtaining the chronological distribution of the reception radiation fields, evaluating this chronological distribution to determine the topical position of the waveguides being measured as well as the light power conducted in each of the waveguides, adjusting the infeed time and transmission power of the transmission radiation fields during its motion across the infeed sections of the light waveguides with respect to the determined variables with regard to power and position of each respective waveguide.

26. In a method according to claim 25, wherein the transmission radiation field of the light spot is moved across the plurality of waveguides with a duration of movement, and is positioned on each waveguide for a time interval of between 1% and 10% of the total duration of movement of the light spot and is positioned to begin coupling light into each successive waveguide in a time interval of 3% to 30% of the duration of the light spot movement.

27. In a method according to claim 25, wherein the creation of the transmission radiation field of the light spot creates a continuous beam directed on the infeed sections of the light waveguides during its movement of the transmission side.

28. In a method according to claim 25, wherein the step of controlling the light spot includes pulsing the light spot to provide pulses of radiation separated by intervals without radiation.

29. In a method according to claim 25, wherein the step of moving the light spot across the light waveguides moves the light spot with a steady sweeping motion.

30. In a method according to claim 25, wherein the step of moving the light spot across the waveguides moves the light spot in a stepped manner.

31. In an apparatus for measurements of a plurality of light waveguides having an optical transmission/coupling means for coupling light to light waveguides, an optical receiving means for receiving light decoupled therefrom, said optical receiving means including at least one reception means for receiving light coupled from the waveguides and transferring the received light to an evaluation means for evaluating the light, the improvements comprising said transmission/coupling means being constructed to form a light spot of the transmission radiation field at a transmission side for movement in a chronological succession across infeed sections of the aligned waveguides to be measured, said reception means of the optical receiver means at a receptive side being aligned and constructed for acquiring a reception radiation field of the light waveguides to be measured in the chronological distribution allocated to the infeed of the transmission side, said reception means generating reception signals and supplying the reception signals to the evaluation means for evaluating, and drive means between the optical transmission/coupling means and the reception means for controlling the light spot of the transmission radiation field on the transmission side for coupling light into the infeed section of each waveguide to be measured in response to the evaluation of the chronological distribution of the reception radiation fields on the reception side decoupled from the waveguide to be measured.

32. In an apparatus according to claim 31, wherein the light waveguides to be measured are mechanically connected to one another, preferably in the form of light waveguide ribbon.

33. In an apparatus according to claim 31, wherein the transmission/coupling means includes a flex coupler.

34. In an apparatus according to claim 31, wherein the evaluation means is connected to the drive means so that the movement of the transmission radiation field on a transmission side is controlled with the chronological distribution of the reception radiation fields.

35. In an apparatus according to claim 31, wherein the evaluation means includes a central processor unit which evaluates the chronological distribution of the reception radiation field.

36. In an apparatus according to claim 31, wherein the transmission/coupling means includes beam deflection means for moving the transmission radiation field during coupling of the light into the waveguides to be measured.

37. In an apparatus according to claim 31, wherein the optical transmission/coupling means includes imaging optics disposed between a source of the radiation and the infeed sections of the waveguides to be measured.

38. In an apparatus according to claim 31, which includes a multi-splicing device and further includes means for aligning the ends of a first group of light waveguides to be measured connected to the transmission/coupling means and the ends of a second group of waveguides to be measured connected to the optical receiver means.

39. In an apparatus according to claim 31, wherein the apparatus is a component part of an attenuation measuring apparatus.

40. In an apparatus according to claim 31, wherein the transmission/coupling means is provided with means for imaging a transmission radiation field as a light spot for illuminating infeed sections of the light waveguides to be measured in a chronological succession as the spot moves in a scan direction, said means for imaging forming the light spot with a greater spatial expanse in a direction extending perpendicular to both the scan direction and the propagation direction of the transmission radiation in the respective waveguide than the expanse of the spot in said scan direction.

41. In an apparatus according to claim 31, wherein the evaluation means includes a central processing unit having a memory means, so that reception signals received by the reception means during at least a first scan of the transmission radiation field on the waveguides to be measured can be registered in said memory, said evaluation means including control means for utilizing the signals registered in said memory to create control functions for the following measurements of the basis of said registration signal.

42. In an apparatus according to claim 41, wherein the control means on the reception side is allocated to the optical receiver and/or the evaluation means.

43. In an apparatus according to claim 42, wherein an integrator is provided on the reception side, said integrator selectively identifying the light powers on the reception radiation fields in response to signals from said control means.

44. In an apparatus according to claim 43, which includes trigger means being allocated to trigger means for placing the reception signal between the integrator and the memory.

45. In an apparatus according to claim 44, wherein the trigger means is a switch.

46. In an apparatus according to claim 41, which includes an amplifier, means for providing a gain factor for the reception radiation field prior to the reception signal being analyzed.

47. In an apparatus according to claim 31, wherein the transmission/coupling means utilizes a flex coupling principle for holding the waveguides to be measured along a curved path, said transmission/coupling means including imaging means for forming a focusing surface for the transmission radiation field in the direction of the infeed surface of the infeed sections to be inclined to an imaginary first plane extending perpendicular to the beam direction.

48. In an apparatus according to claim 47, wherein the imaging means includes a glass wedge.

49. In an apparatus according to claim 31, wherein the transmission/coupling means includes deflection means being provided for moving a light spot of the transmission radiation field back and forth along a longitudinal axis of the respective light waveguide to be measured in the coupling region.

* * * * *